United States Patent [19]
Harbaugh

[11] Patent Number: 5,535,871
[45] Date of Patent: Jul. 16, 1996

[54] DETECTOR FOR A SECURITY THREAD HAVING AT LEAST TWO SECURITY DETECTION FEATURES

[75] Inventor: Steven K. Harbaugh, Castro Valley, Calif.

[73] Assignee: Authentication Technologies, Inc., Dublin, Calif.

[21] Appl. No.: 520,374

[22] Filed: Aug. 29, 1995

[51] Int. Cl.$^6$ ............................................. G07D 7/00
[52] U.S. Cl. ............................................. 194/206; 324/663
[58] Field of Search ............................ 194/206, 207; 209/534; 324/663, 672

[56] References Cited

U.S. PATENT DOCUMENTS

| | | | |
|---|---|---|---|
| 3,980,990 | 9/1976 | Berube . | |
| 4,255,652 | 3/1981 | Weber | 209/534 X |
| 4,355,300 | 10/1982 | Weber | 340/146.3 |
| 4,524,276 | 6/1985 | Ohtombe | 250/338 |
| 4,536,709 | 8/1985 | Ishida | 324/239 |
| 4,652,015 | 3/1987 | Crane | 283/91 |
| 4,761,205 | 8/1988 | Crane | 162/103 |
| 4,980,569 | 12/1990 | Crane et al. | 250/556 |
| 5,122,754 | 6/1992 | Gotaas | 324/676 |
| 5,151,607 | 9/1992 | Crane et al. | 250/556 |
| 5,260,582 | 11/1993 | Danek et al. | 250/556 |
| 5,279,403 | 1/1994 | Harbaugh et al. | 194/207 |
| 5,308,992 | 5/1994 | Crane et al. | 250/556 |
| 5,394,969 | 3/1995 | Harbaugh | 194/206 |
| 5,417,316 | 5/1995 | Harbaugh | 194/206 |
| 5,419,424 | 5/1995 | Harbaugh | 194/206 |

FOREIGN PATENT DOCUMENTS

| | | |
|---|---|---|
| 0133656 | 7/1984 | European Pat. Off. . |
| 0158079 | 2/1985 | European Pat. Off. . |
| 2211976 | 7/1989 | United Kingdom . |

OTHER PUBLICATIONS

IBM Technical Disclosure Bulletin, vol. 28, No. 1, Jun. 1985, *Capacitive Item Sensor For Supermarket Scanner*, pp. 376–377.

*Primary Examiner*—F. J. Bartuska
*Attorney, Agent, or Firm*—Richard H. Kosakowski; Holland & Bonzagni

[57] ABSTRACT

A security thread for documents such as currency and banknote paper comprises a plastic substrate coated with a plurality of discrete metallic patterns of electrically-conductive material, such as aluminum. The metallic patterns are arranged on the surface of the thread to indicate the particular denomination of the currency paper. The thread is typically embedded entirely with the currency paper. A first embodiment of a verification device determines the authenticity and denomination of the currency paper by counting the number of conductive metallic patterns on the thread and comparing the count to various count ranges. A second embodiment of the verification device scans the thread in a narrow-edge direction such that it simultaneously encounters all of the conductive thread segments. Capacitive coupling of an oscillator signal into one or more sensing pads result in an electrical signal having a distinct pattern. This signal is compared to a plurality of signals stored in memory that are indicative of valid thread denominations.

18 Claims, 10 Drawing Sheets

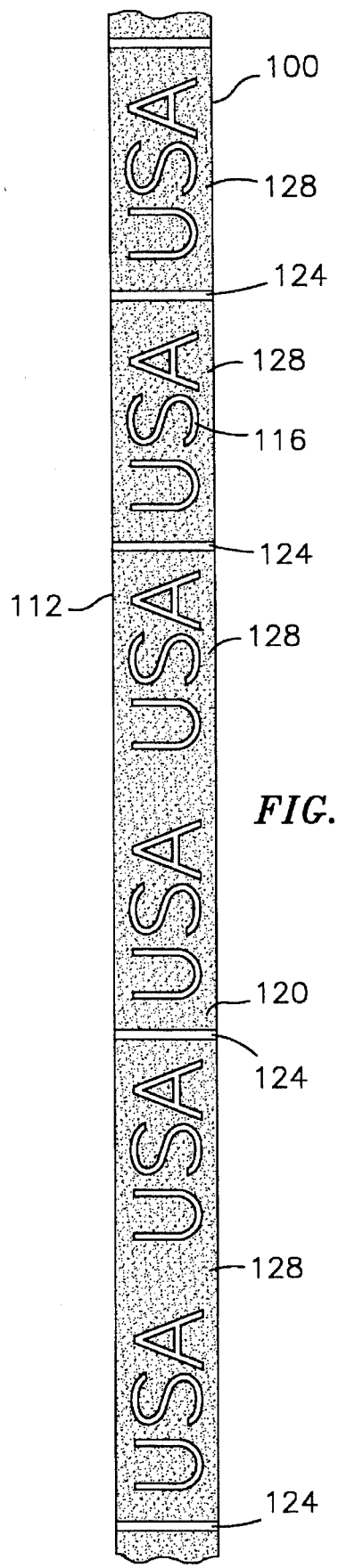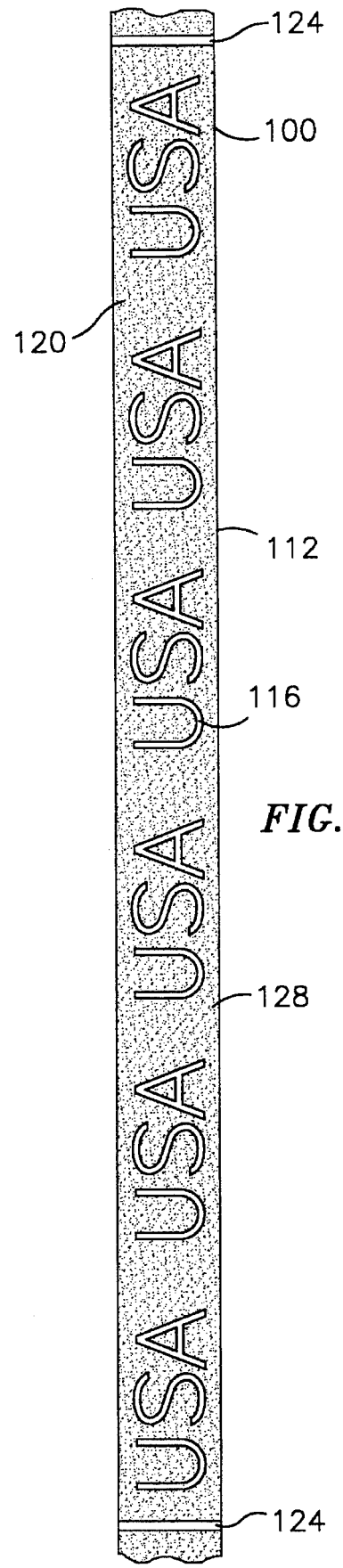
*FIG. 3*  *FIG. 4*

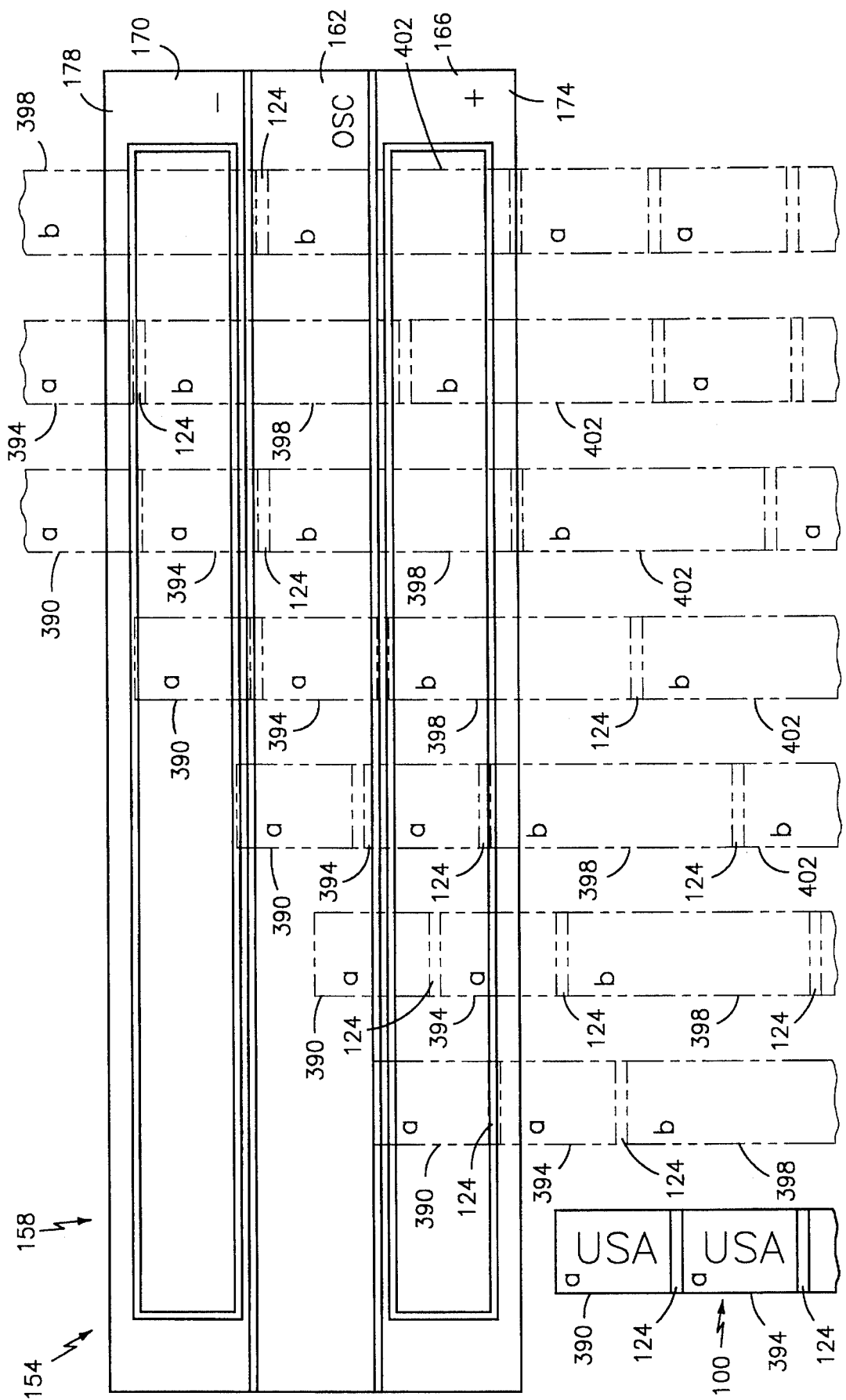

DETECTOR FOR A SECURITY THREAD HAVING AT LEAST TWO SECURITY DETECTION FEATURES

BACKGROUND OF THE INVENTION

This invention relates to apparatus for verifying the authenticity of documents, and more particularly to such verification apparatus for detecting a metallized security thread embedded in currency or banknote paper and for determining its authenticity by detecting the currency paper's denomination indicated by coded metallic patterns disposed on a surface of the security thread.

It is known in the art of currency and banknote papers to incorporate or embed a security thread partially or fully within the paper. The use of such security threads has increased due to the increasing prevalence of high-resolution scanners and true-color photocopying machines and printers—the tools of modern counterfeiters. If modern currency or banknote papers do not have an embedded security thread, the currency can be more easily duplicated with a color photocopier. However, if the security thread is embedded within the paper, the characteristics of the thread are harder to illicitly reproduce.

It is known in the art that the thread may comprise a plastic film or substrate having selected aluminum characters formed on one or both surfaces of the substrate. The thread is typically embedded entirely within the currency paper and is not present on either surface of the paper. Such security threads for use in U.S. currency are described in greater detail in U.S. Pat. Nos. 4,652,015 and 4,761,205. The security thread has printed characters of extreme fine-line clarity and high opacity such that human-readability of the printing is possible by means of transmitted light. Yet, the printing remains completely indiscernible to the human eye under reflected light. Further, the highly reflective metallic coating causes the thread to virtually disappear under the reflected light used by modern photocopier equipment. If the printing were legible under reflected light, the public could rely upon the presence of the printed matter solely by visual inspection. The printing would then be easily replicated by counterfeit means.

The aforementioned patents ensure that the public does not come to rely on such an easily simulated security thread characteristic. This is accomplished by a method of manufacturing currency and banknote papers containing a security thread that is virtually invisible under reflected light with no manifestation on the surface of the currency or banknote paper that such a security thread is present within the note. Thus, authentication of such a security thread is carried out in a two-fold test; namely, wherein the thread is legible under transmitted light and invisible under reflected light.

An easy way of checking the authenticity of such a security thread is to place the currency under an intense light source to observe the thread characters by the human eye. Although visual inspection can generally detect the counterfeit notes (given the proper lighting conditions), visual inspection is slow, time consuming and expensive. Further, in commercial situations where such an intense light source is unavailable (thus making a human check for thread presence and authenticity virtually impossible), it is desirable to provide means for automatically determining the thread's presence and authenticity. Various means for verifying the presence and authenticity of the aforementioned security thread are exemplified in U.S. Pat. Nos. 4,980,569 and 5,151,607.

The '569 patent discloses a verification device comprising two optical light source/detector pairs disposed on opposite sides of a currency paper. The source and detector pairs are arranged for transmission and reception of optical energy through the currency if the thread is not present. Also, the source and detector pairs can determine the presence of a counterfeit thread on the currency surface by checking for light reflected off of the currency surface. Thus, the '569 patent provides a two-fold test wherein the thread, to be genuine, must be detected under transmitted light, and not be detected under reflected light. However, the device in the '569 patent may give a false indication of the authenticity of a counterfeit currency when a pencil line is drawn on the currency surface at the normal thread location.

In an attempt to overcome the shortcomings of the '569 patent, the '607 patent discloses a verification device comprising the optical means of the '569 patent in combination with a magnetic detector. The magnetic detector determines the presence of the security thread, while the optical means determines whether the thread is properly within the currency or improperly disposed on either surface.

In light of the shortcomings of optical methods of verifying the presence of the security thread within the currency paper, other verification means have been developed, such as capacitive devices. These devices operate on the principle of detecting a change in capacitance of a sensor, such change being due to the dielectric properties of the metallized security thread. The metallized thread has dielectric properties that are vastly different from those of the paper. The security thread operates as one plate of a capacitor, and draws charge off of a second plate of the capacitor, the second plate typically being a sensing part of the verification device. In contrast, the paper itself has little or no effect on the amount of charge on the sensing plate. Thus, the security thread effectively increases a capacitance value that is sensed by the verification device, a detectable feature.

However, capacitance verification devices have shortcomings in that they can also be fooled by conductive marks, such as pencil lines, placed on the surface of the currency. This can be especially problematic for currency verification devices used for unattended transactions; for example, in vending machines that incorporate currency acceptors. Automatic vending machines, such as those that dispense soft drinks and cigarettes, are gradually accepting higher denomination currency bills in unattended transactions as payment. This is due, in part, to the inflationary prices of goods. Also, unattended bill acceptors are expanding into areas such as gaming and other entertainment vending areas, and gas stations. The addition of bill acceptors and/or changers in these vending machines has resulted in a large increase in sales for unattended transactions. For these types of machines, it is imperative that the bill acceptor/changer have some means for reliably discriminating between genuine and counterfeit bills. Examples of security thread verification devices that provide for machine readability of a metallized security thread using a capacitance bridge technique are disclosed in U.S. Pat. Nos. 5,308,992 and 5,394,969.

The aforementioned security thread may have its printed characters formed on the plastic substrate either in the form of positive image metal characters or partially demetallized threads that display negative image or clear characters. In other words, the positive image thread has metal characters formed on the plastic substrate. The metal only occupies the areas on the thread defined by the characters. Such positive image threads are used in United States currency paper. On the other hand, the negative image thread has its characters formed by the removal of metal at the desired character locations. The non-character portion of the thread surface is coated with metal. Therefore, the non-metal or "clear text" characters are defined by metal boundaries. Such negative image security threads are used in currencies such as the German Deutsche Mark.

In contrast to the two types of security threads described hereinabove having selected metallized characters formed thereon, it is known in the art to use a "solid" security thread. Such a thread comprises a plastic substrate having metal (e.g., aluminum) deposited entirely on one or both surfaces of the plastic substrate. Such "solid" or "continuously metallized" threads sometimes have indicia printed thereon indicative of, e.g., currency denomination. However, normally the printing cannot be seen even under an intense light source; therefore, such printing is oftentimes eliminated. It is known to use such "solid" security threads within the currency of, e.g., Saudi Arabia.

The aforementioned three types of security threads may all be visually detected by the human eye by first holding the currency paper up to relatively strong transmitted light and then verifying the presence of the thread within the paper. Also, these threads may also be automatically or machine detected by various means, including the aforementioned capacitive detection schemes. However, all such schemes merely determine only the presence or absence of the three types of thread within the paper. The authenticity of the paper then depends only upon the presence or absence of the thread within the paper. With such threads, there typically is no known method of determining a distinguishing feature of the paper, such as its denomination, using capacitive techniques. This is due primarily to the small size of the characters formed on the thread. Instead, optical character recognition or other imaging-based schemes would have to be employed to ascertain such relatively detailed information, such as denomination, as indicated by the printed text used by the aforementioned security threads.

In the alternative, the aforementioned threads or other types of threads may be coated with a layer of magnetic material, and also with either a luminescent, an x-ray absorbent, or a non-magnetic metal material. The magnetic material may be applied in a coding pattern (e.g., magnetic coating applied discontinuously onto a thread with the discontinuities detected with a field-detecting device, or two different magnetic materials provided in alternating bands along the thread), as described in U.S. Pat. No. 4,183,989. However, such feature, although machine readable, does not offer a public security feature, such as printed text, that is visual under transmitted light. Moreover, relying upon the field produced by a certain magnitude or configuration of magnetic materials is problematic in that such coded variations are subject to obliteration by intentional or accidental demagnetization subsequent to the original magnetization.

In addition, although magnetic metal, such as iron oxide coatings, can be applied discontinuously onto a thread in a bar code-like sequence or in varying depths of coating, to accomplish a machine-readable feature, such application processes require specialty screen printing equipment to apply the iron oxide slurry in defined bars. Moreover, magnetic field array detectors are required to resolve the coded sequence. These array detectors are expensive to manufacture and are particularly problematic for reading threads when banknotes or other documents are processed narrow-edge versus wide-edge, where the number of sites on the array that are processed for the wide-edge feed condition are reduced.

Therefore, in response to the difficulty of obtaining a relatively simplified method of providing a security thread having easily-implementable features indicative of denomination, a security thread may be provided comprising a plastic substrate having a sequence of coded metallic patterns deposited on one or both substrate surfaces in a repeating pattern. Such repeating pattern provides a first type of security detection feature. A second type of security detection feature is provided by metallic indicia, either in the form of positive- or negative-image characters formed at various locations within the repeating metallic patterns. This second security feature allows for manual visual verification by the human eye of both the thread and its denomination under relatively strong transmitted light.

Accordingly, it is a primary object of the present invention to provide a device that verifies both the authenticity and denomination of a currency paper.

It is a general object of the present invention to provide a device that verifies both the authenticity and denomination of a currency paper by detecting a security thread embedded within the paper.

It is a further object of the present invention to provide a device that verifies both the authenticity and denomination of a currency paper having a rectangular-shaped security thread embedded therein, wherein the security thread is normally embedded in the paper in a direction parallel to the narrow edge of the paper, the device being able to detect the thread as the device is passed over the thread either parallel to the long dimension of the thread (i.e., in the wide-edge direction), or perpendicular to the long dimension of the thread (i.e., in the narrow-edge direction).

It is still another object of the present invention to provide a device that rapidly senses and counts the number of electrically-conductive patterns on a security thread embedded within currency paper or the like in order to both authenticate the currency paper and determine its denomination.

It is yet another object of the present invention to provide for high-speed, automated document verification.

It is still another object of the present invention to provide for cost-effective counterfeit deterrence in security documents such as currency paper.

It is another object of the present invention to provide for a currency paper authentication and denomination determining device that can be easily and cost effectively incorporated into known or future automated processing equipment, such as high-speed central bank sorting machines, low-cost table-top currency counters found in local bank branches or businesses, and bill acceptors and/or changers embodied in vending machines.

It is yet still another object of the present invention to provide for accurate low-cost, high-speed commercial sorting of currency paper.

The above and other objects and advantages of this invention will become more readily apparent when the following description is read in conjunction with the accompanying drawings.

SUMMARY OF THE INVENTION

To overcome the deficiencies of the prior art and to achieve the objects listed above, the Applicant has invented a device for both authenticating currency paper and determining its denomination.

The device performs the above functions by detecting the presence of a metallized security thread embedded within the document and "reading" the denomination therefrom.

Typically the thread is rectangular in shape and is embedded within the currency paper with its long dimension parallel to the narrow dimension of the currency paper (i.e., perpendicular to the wide dimension of the currency paper). The thread contains a predetermined number of discrete electrically-conductive segments separated by corresponding electrically-insulative segments. The length of each conductive segment is ultimately indicative of the denomination of the associated currency paper. Within the electrically-conductive segments may also be formed electrically-insulative areas in the shape of predetermined characters. These characters may be indicative of the denomination of the currency paper and are typically observed by the human eye upon holding up the paper to relatively strong transmitted light.

In a first preferred embodiment, the device contains a sensor pad arrangement that senses the number of conductive thread segments when the sensor pad is moved relative to the thread in a parallel direction over the long dimension of the thread. The sensor pad comprises three separate electrically-conductive electrodes or pads: a centrally-located oscillator pad flanked on each side by a sensing pad. A first outer sensing pad is a "positive" pad, while a second outer sensing pad is a "negative" pad. An oscillator signal generated by signal processing electronics is fed to the oscillator pad, while each sensing pad is connected to the signal processing electronics. When the sensor pad arrangement is scanned over the thread in this "wide feed" direction, each conductive thread segment of a certain length capacitively couples the oscillator signal into the two outer sensing pads, but at different points in time during the scan sequence. The signal processing electronics senses the signals from the two outer sensing pads and counts the number of conductive thread segments. The signal processing electronics compares the resulting count number of segments to several different count number ranges to determine the currency paper denomination. This denomination may be visually indicated.

In a second preferred embodiment, the device contains a sensor pad arrangement that senses the number of conductive thread segments when the sensor pad moves relative to the thread in a perpendicular direction over the long dimension of the thread. This is referred to as the "narrow feed" direction of scanning. Because of this difference in scanning direction from the first preferred embodiment, the sensor pad arrangement encounters all of the electrically-conductive thread segments at once. In contrast, in the wide feed direction, the sensor pad arrangement encounters the conductive thread segments one at a time. Thus, for this second preferred embodiment, the sensor pad arrangement comprises an array of a plurality of separate pads. The total length of the array may be at least equal to the overall length of the thread, to be able to "see" or detect all of the thread segments at once. Each pad is slanted or angled somewhat with respect to the thread. The array of the plurality of pads is connected to the signal processing electronics such that the first pad is a "negative" pad, followed by an oscillator pad, a "positive" pad, an oscillator pad, a "negative" pad, and so forth in such a repeating pattern. All of the "positive" pads are connected together in the signal processing electronics, while all of the "negative" pads are connected together in the signal processing electronics. On the other hand, each oscillator pad is individually connected to an output of a multiplexer that applies the oscillator signal to one oscillator pad at a time in a sequence. The input of the multiplexer is connected to the oscillator signal.

In operation of this second preferred embodiment, as the sensor pad array is scanned over the thread, each conductive thread segment (depending upon its length) may capacitively couple the oscillator signal on each oscillator pad into either none or one of the outer "positive" or "negative" sensing pads. The multiplexer is triggered fast enough to effectively place the oscillator signal on all of the oscillator pads, one at a time, in a sequential manner during the time that the entire thread is disposed over the sensor pad array. The signal processing electronics senses the resulting pattern of signals from all of the "positive" and "negative" sensing pads and compares the resulting pattern to a plurality of predetermined patterns stored in memory to determine the denomination of the currency paper. This denomination may then be visually indicated to the user.

BRIEF DESCRIPTION OF THE DRAWINGS

FIG 3 illustrates one exemplary embodiment of the security thread of FIGS. 1 and 2;

FIG. 4 illustrates a second exemplary embodiment of the security thread of FIG. 3;

FIG. 6 illustrates a sensor pad arrangement of the device of FIG. 5 in relation to the security thread of FIG. 3 disposed at a plurality of different spatial positions (6(a)–6(g)) of the thread with respect to the sensor pad arrangement;

FIG. 7, including

FIG. 9, including FIG. 10, including

DETAILED DESCRIPTION OF THE PREFERRED EMBODIMENTS

Figure 1:
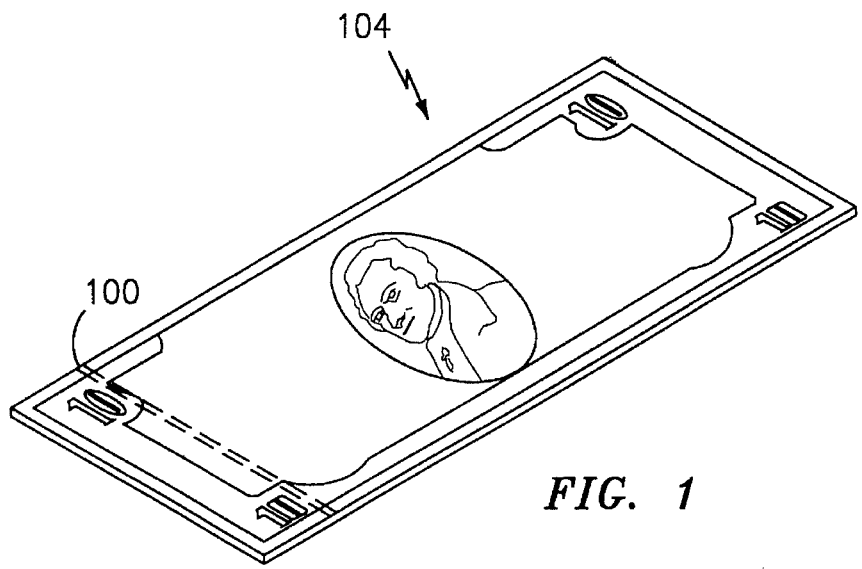
FIG. 1 is a perspective view of a currency or banknote paper having a metallized security thread embedded therein.

Referring to the drawings in detail, a preferred embodiment of a security thread 100 for use with a document 104, such as currency or banknote paper, is illustrated therein. Also illustrated are two alternative preferred embodiments of a device 108 for determining the authenticity and denomination of the currency paper 104 by detecting certain coded features of the security thread 100. In particular, codes for various denominations of the currency or banknote paper 104, along with other information important to the issuer of the document, are permanently and irreversibly etched into the thread 100 by using different sizes and spacing of conductive patterns.

FIGS. 1–4 illustrate an example of currency or banknote paper 104 that includes the security thread 100 (illustrated in phantom in FIG. 1) embedded entirely within the paper, and not disposed on any surface of the paper. The thread 100 typically extends from top to bottom and transversely across the linear extent of the currency paper 104. That is, the rectangular-shaped security thread 100 has its long dimension parallel to the narrow dimension or edge of the currency paper 104. Conversely, the long dimension of the security thread 100 is perpendicular to the long dimension or wide edge of the rectangular-shaped currency paper 104.

Figure 2:
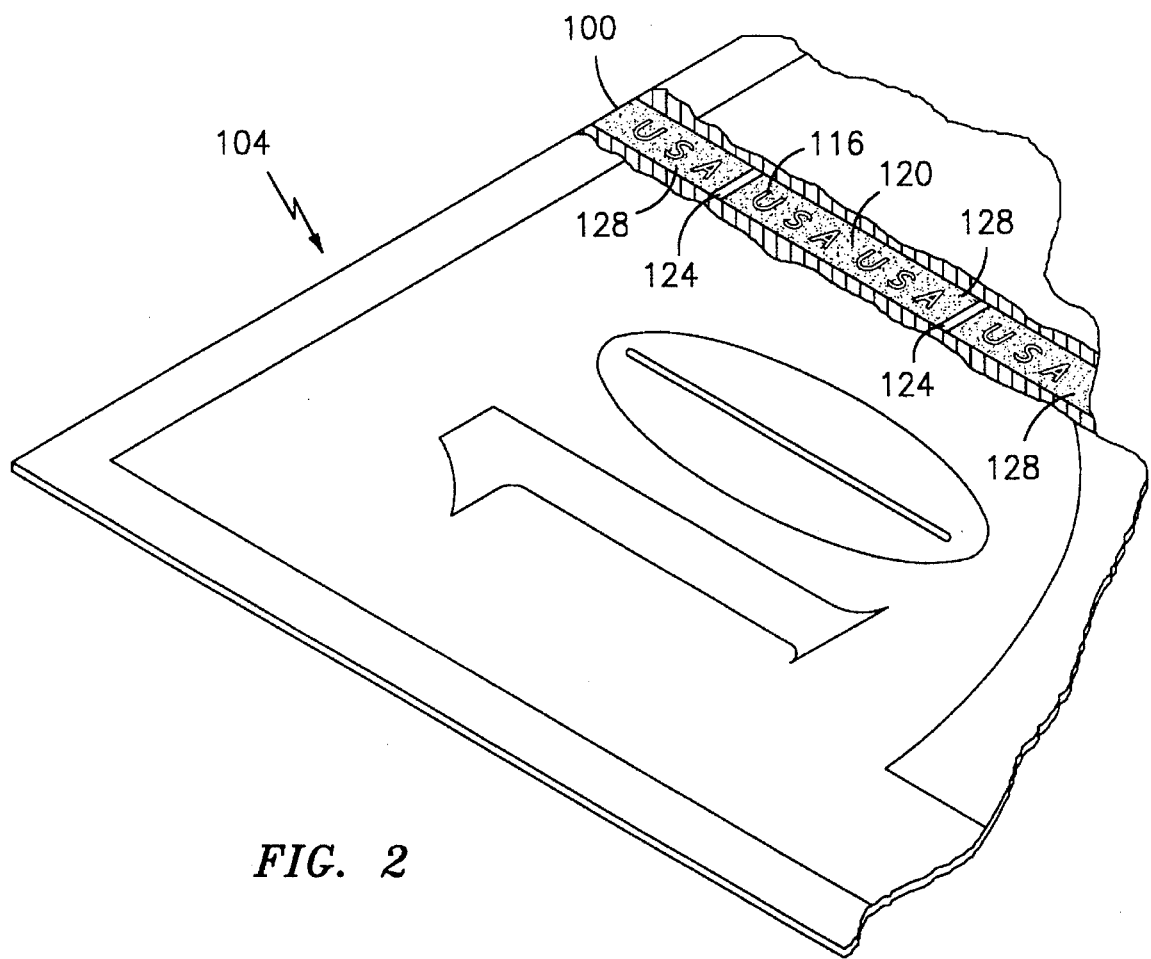
FIG. 2 is a perspective view, partially cutaway, of a portion of the currency paper of FIG. 1, illustrating in greater detail the embedded security thread within the currency paper.

The security thread 100 comprises an insulative (e.g., plastic or mylar) substrate 112 having a plurality of metallized, alphanumeric characters 116 formed on at least one surface of the substrate. In each of two alternative embodiments of the thread 100 illustrated in FIGS. 3 and 4, the metallized characters 116 are formed on the thread surface as "negative image" or "clear text" characters. That is, the alphanumeric characters themselves are defined by the plastic substrate 112 and outlined by the deposited metal 120. As illustrated in FIGS. 2–4, these characters 116 comprise, in an exemplary embodiment, the characters "USA". However, it is to be understood that any arrangement of characters may be utilized. It suffices that these alphanumeric characters comprise a first security detection feature of the thread 100. This security detection feature is one that is manually verified by the human eye by holding up the currency paper 104 to relatively strong transmitted light and reading the characters thereon. Yet, the characters 116 are indiscernible under reflected light Thus, in an alternative to "USA" the characters may comprise some numerical indicia of denomination of the currency paper 104.

A second security detection feature of the security thread 100 is embodied by gaps or spaces 124 between the electrically-conductive metallic regions 128 on the surface of the thread 100. Each space 124 is preferably embodied by either a removal or a non-placement of the metallic material 120 on one or both surfaces of the substrate 112 throughout the entire width of the thread 100. The spaces 124 are located at various predetermined points along the length of the thread. This results in the repeating pattern of electrically-conductive regions 120 and non-electrically-conductive regions 124 along the entire length of the thread 100. By "coding" these conductive regions 128 through use of different sizes of such regions, codes for various denominations and other information regarding the currency paper 104 may be placed in the thread 100.

In a preferred embodiment, the thread substrate 112 comprises plastic; however, it is to be understood that the substrate may comprise any clear or translucent non-conductive material. Such materials may include polyester, regenerated cellulose, polyvinylchloride and other plastic film. The substrate 112 may have a width ranging from approximately 0.5 millimeters (mm) to about 3.0 mm.

In a preferred embodiment, the metal 120 deposited on the surface of the substrate 112 comprises aluminum. However, other metals may be utilized. The aluminum may be deposited onto the substrate surface using a variety of techniques, such as vacuum deposition or sputtering. However, other methods may be utilized, such as selective metallization by electro-deposition, directly hot-stamping onto the thread surface, or using a mask or template in a vacuum metallizer, and methods involving metallization and selective demetallization by chemical etching, laser etching and the like. In a preferred embodiment, after the aluminum is vacuum deposited onto the substrate surface, the alphanumeric characters 116 and the non-electrically-conductive spacer regions 124 are formed on the thread 100 by a resist and etch technique. The aluminum deposited on the thread has a thickness in a range of 100–400 angstroms.

In a preferred embodiment, the security thread 100 is totally embedded within the currency paper 104. However, this is purely exemplary; it is to be understood that the security thread may only be partially embedded (at selected locations) within the paper, or it may be mounted on the surface of the currency paper or other security documents, either during the manufacture of such documents or post-manufacture. Nonetheless, the security thread 100 is embedded within the document 104 using conventional techniques.

In accordance with one security detection feature of the security thread 100, the conductive regions 128 may be of varying lengths. In other words, the distance along the length of the thread 100 between consecutive non-electrically-conductive regions 124 may differ along the entire length of the thread. In this way, the different pattern lengths, when taken together along the entire thread length, may be used as indicia of a characteristic of the document. For example, when the document is a currency or banknote paper 104, the different pattern lengths may indicate different denominations of the currency paper. That is, "cutting" the conductive thread into specific lengths to form codes can be used to denominate the currency. A large number of possibilities of different thread lengths exists. Thus, it follows that a large number of different denominations also exists. Examples of these varying thread segment lengths can be seen in FIGS. 3 and 4.

FIG. 3 illustrates a thread 100 having a pair of electrically-conductive regions 128 adjacent each other that are of a first length dimension. Within each of these conductive regions is disposed one set of characters 116: ie., "USA" In a preferred embodiment, the length of this smallest region is approximately 0.1 inches. This dimension includes the length of the conductive region 128 plus the length of one of the adjacent non-conductive spaces 124.

The thread 100 of FIG. 3 also includes two longer conductive regions 128. Each of these regions 128 is of a length that contains two of the character sets 116: i.e., "USA". In a preferred embodiment, the length of this longer region 128 is 0.2 inches. On the other hand, FIG. 4 illustrates an exemplary situation where the electrically-conductive region is 0.6 inches in length; that is, it contains six character sets 116.

It is to be understood that the length of the conductive thread segments 128 of the thread 100 of each of FIGS. 3 and 4 is purely exemplary. Any combination of lengths of the conductive thread regions 128 may be utilized. It suffices that the regions, when taken together, be ultimately indicative of various denominations of currency paper 104; that is, a predetermined arrangement of conductive regions 128 is indicative of one type of denomination of the currency. Other currency denominations are indicated by arrangements of the conductive regions 128 on the thread substrate 112 such that they vary from each other. The reasoning for using such varying coded metallic patterns 128 will become more readily apparent in light of the description hereinafter of exemplary preferred embodiments of devices 108 for detecting such threads 100 in determining the denomination of the currency therefrom.

Figure 5:
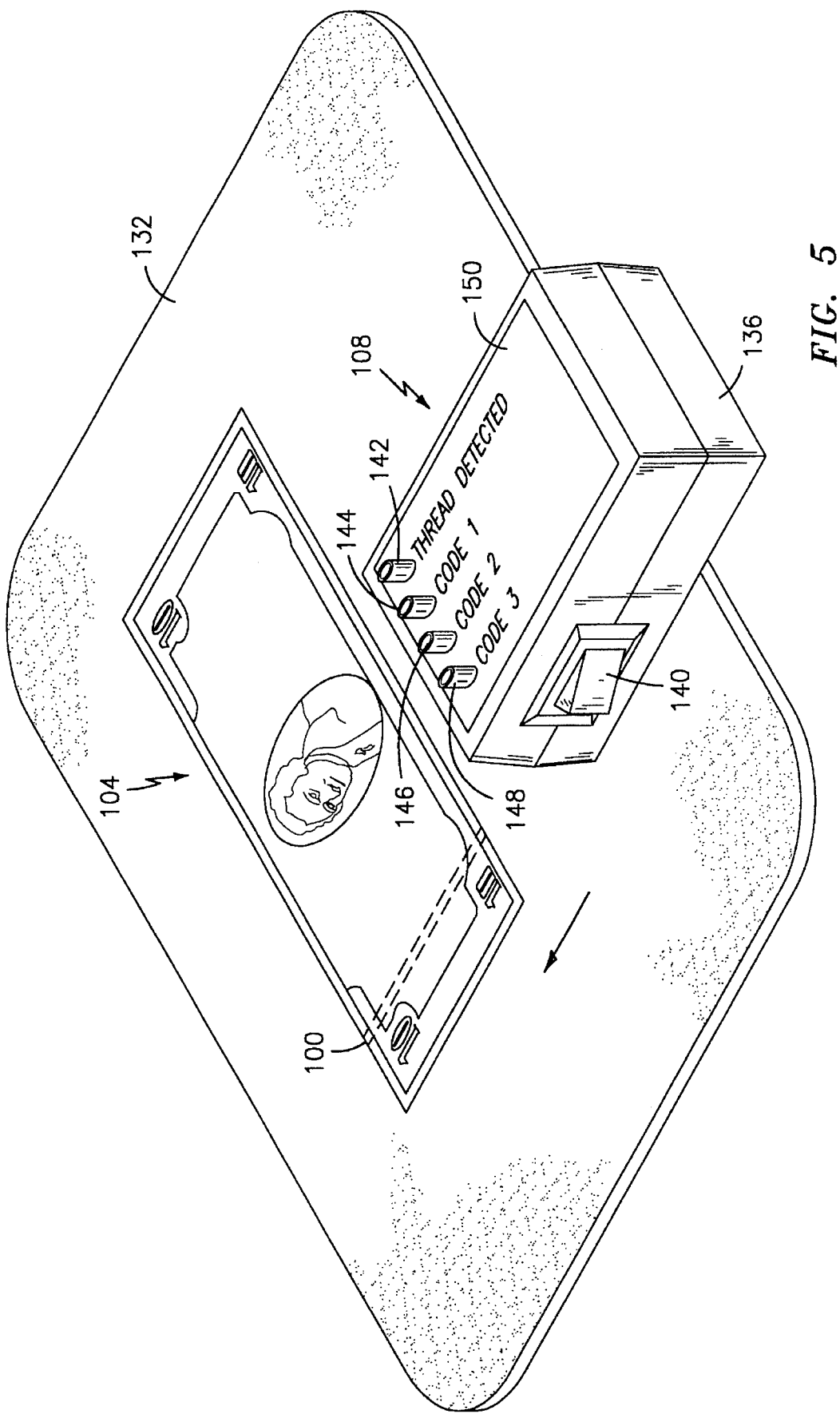
FIG. 5 illustrates a perspective view of the currency paper of FIG. 1 disposed on a surface, and of a device according to a first embodiment of the present invention for scanning the currency paper and determining the authenticity and denomination of the paper from the security thread embedded therein.

Referring to FIG. 5, there illustrated is a device 108, according to a first preferred embodiment of the present invention, for scanning the security thread 100 and determining therefrom its denomination, and therefore its authenticity. The currency or banknote paper 104 to be tested may be placed on a smooth surface, such as a computer mouse pad or tabletop 132. The currency 104 is placed such that its top side is facing up. Such would be desirable if a security thread 100 was employed where only one surface (i.e., the top surface) of the thread had metallic patterns 128 coded thereon. However, if both opposing sides of the thread substrate 112 have the metallic patterns 128 coded thereon, then it is irrelevant which side of the currency paper 104 is facing upward. The security thread 100 is illustrated in phantom within the currency paper.

The hand-held device 108 of FIG. 5 preferably scans the thread 100 by starting at one end of the thread (at the bottom edge of the currency paper 104) and proceeding along its length to the other end of the thread, as indicated by the arrowhead in FIG. 5. In other words, the hand-held device 108 approaches the currency paper 104 along its long dimension (that is, the device 108 is a "wide-edge feed" detector). As illustrated, the device 108 comprises a hand-held plastic case or housing 136 that contains a side panel switch 140, together with four light-emitting diodes ("LEDs"), 142–148 mounted on the top panel 150 of the device.

As best seen in FIG. 6, a bottom panel 154 of the device contains an arrangement 158 of three electrically-conductive pads. These pads comprise a centrally-located oscillator pad 162 flanked on each side by a corresponding sensing pad 166, 170. Each sensing pad 166, 170 is encircled by a corresponding guard pad 174, 178. These rectangular-shaped pads 162–178 are oriented on the bottom panel 154 of the device 108 such that the long dimension of the pads is perpendicular to the long dimension of the thread 100. In other words, the long edge of the pads is mounted parallel to the long edge of the currency paper 104. The length of each pad 162–178 is arbitrary; it suffices that the length be longer than the width of the security thread. In an exemplary embodiment, the length of each pad is 0.9 inches.

However, the width of each pad 162–168 is critical and is dependent upon the length of the :smallest conductive region 128 on the thread 100. Since in a preferred embodiment the smallest conductive thread region 12B is 0.1 inches, the width of the oscillator pad 162 plus an adjacent guard ring 174, 178 on one of the sensor pads 166, 170 is also 0.1 inches. Further, the width of each sensor pad 166, 170 plus the width of a guard ring 174, 178 disposed on one side of the length of the sensor pad is also 0.1 inches. The non-conductive spacings between the sensing pads 166, 170 and associated guard rings 174, 178, and between the guard rings and the oscillator pad 162, is 0.005 inches. Also, the guard rings 174, 178 have a width of 0.005 inches in the region between the sensing pads 166, 170 and oscillator pad 162. Further, the guard rings 174, 178 have an outer width of 0.050 inches.

In the exemplary embodiment of FIG. 5, the pads 162–178 comprise a metallic electrically-conductive material, such as aluminum, that is deposited on an insulative (e.g., fiberglass) circuit board (not shown). The circuit board is affixed to the bottom of the housing 136 of the device 108 of FIG. 5. Also, since the overall sensor pad arrangement 158 ideally comes in physical contact with the currency note 104 during sensing of the security thread 100 (for maximum signal strength), it is preferred that the leading and trailing edges of the sensor pad circuit board be chamfered or beveled in order to remove sharp corners which might catch the currency note 104 as the device 108 is being passed thereover. It is preferred that the sensor pad arrangement 158 come in physical contact with the currency paper 104, since any separation between the sensor pad arrangement and the currency paper will decrease the overall output signal strength of the sensor (such output signal being described in detail hereinafter). The sensor pad circuit board may also be recessed within the device housing 136 to lower its profile.

Although a detailed description of the operation of the device 108 of FIG. 5 is given hereinafter in conjunction with the schematic diagram of the entire! system of FIGS. 7(a) and 7(b), the oscillator pad 162 has provided thereto a time-varying oscillator signal. In a preferred embodiment, such signal is a square-wave signal at a frequency of approximately 1–2 Mhz. The oscillator pad 162 radiates energy at the frequency of the oscillator. This radiating energy dissipates into the surrounding environment. In the absence of the security thread 100 from close proximity to the sensor pad arrangement 158, none of this energy is coupled into either or both of the sensor pads 166, 170. These two sensor pads 166, 170 are connected to corresponding signal conditioning and differential amplification circuitry of FIG. 7, described in detail hereinafter. With no conductive material bridging the oscillator pad 162 and one or both of the sensor pads 166, 170, no signal is coupled into the sensor pads. Further, when a non-electrically-conductive material, such as the currency paper 104 itself, is across the oscillator pad 162 and one or both of the sensor pads 166, 170, a small but negligible amount of the energy radiated from the oscillator pad 162 is coupled into one or both of the sensor pads 166, 170. It is only when an electrically-conductive material is present across the oscillator pad and one or both of the sensor pads that there is capacitive coupling of the oscillator signal into one or both of the sensor pads. However, when a conductive material is present across all three pads 162–170, the oscillator signal is equally coupled into both pads 166, 170. On the other hand, when a conductive thread segment 128 is across the oscillator pad 162 and only one of the outer sensor pads 166, 170, there is coupling of the oscillator signal into only one sensor pad and not the other. By connecting each sensor pad to different inputs of the differential amplification circuitry, such coupling can be differentiated between the two pads 166, 170. This is the underlying theory of operation behind the thread 100 and the sensor pad arrangement 158 of the present invention.

The purpose of each guard ring 174, 178 surrounding the associated sensor pad or electrode 166, 170 is to reduce the effects of stray capacitance on the corresponding electrode 166, 170. Otherwise, this stray capacitance would tend to capacitively couple the oscillator signal into one or both sensor pads 166, 170 even in the absence of a conductive thread segment 128.

Figure 7A:
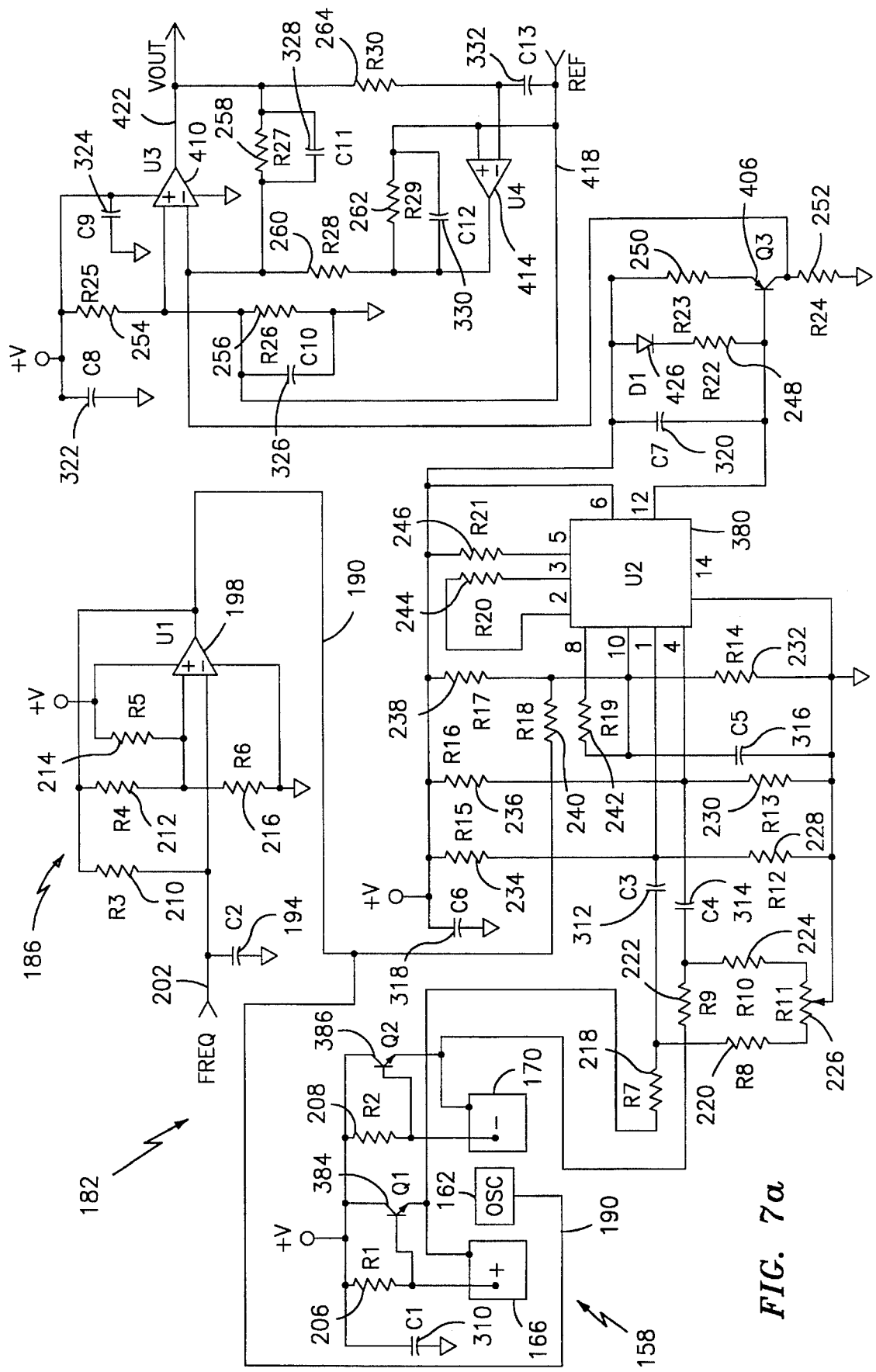
FIGS. 7(a) and 7(b) is a schematic diagram of the electrical connection of the sensor pad arrangement of FIG. 6, together with associated signal processing electronics, all embodied within the device of FIG. 5.
Figure 7B:
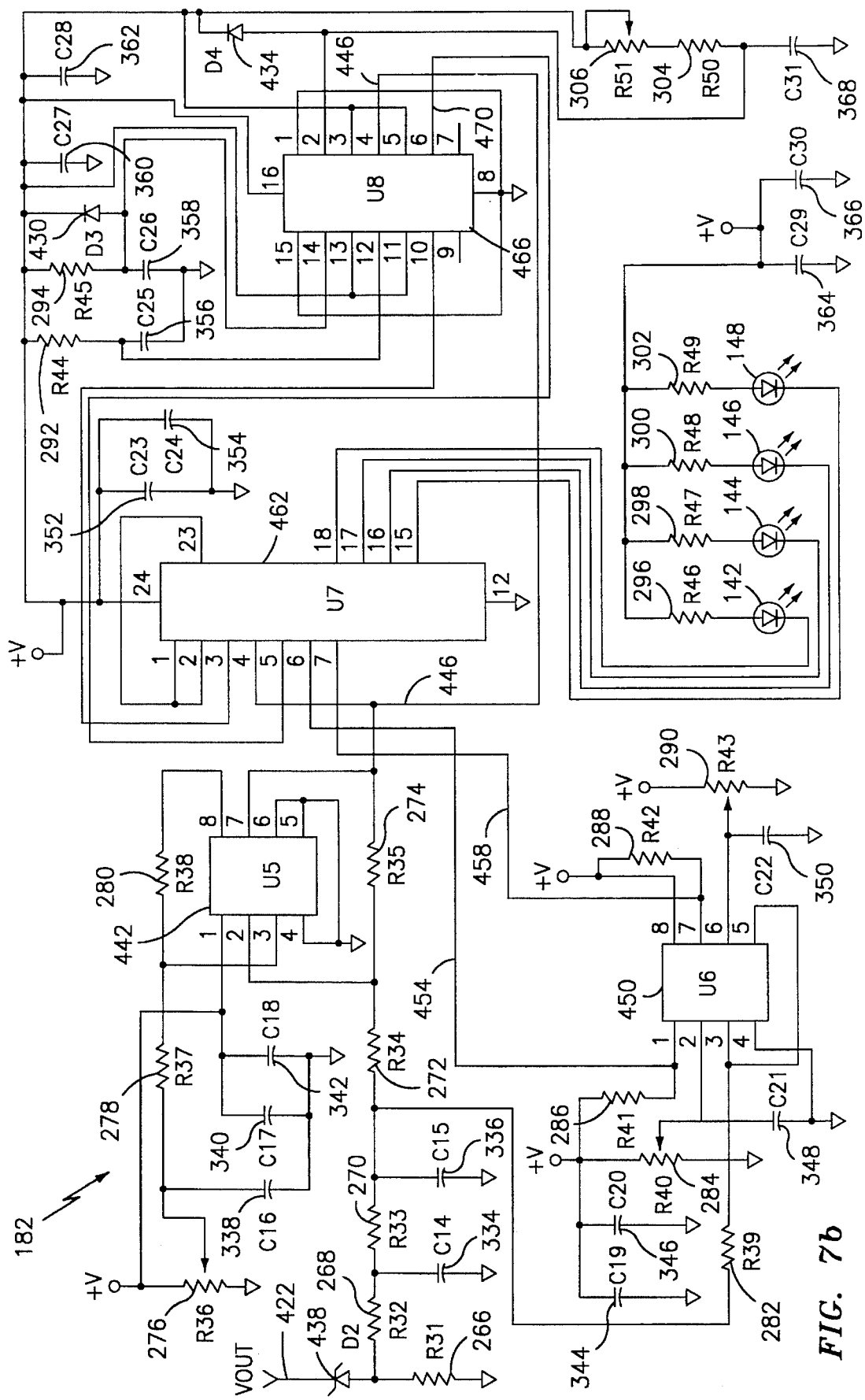

FIGS. 7(a) and 7(b) together comprise FIG. 7 and illustrate a schematic diagram of the sensor pad arrangement 158 of FIG. 6, together with signal processing circuitry 182 for determining the denomination of a currency paper 104 and, thus, its authenticity. All of this circuitry 182 may be disposed on one or more printed circuit boards (not shown) contained within the housing 136 of FIG. 5. This circuitry 182 may be in the form of either discrete components, or selected portions of the circuitry may be implemented within one or more application-specific integrated circuits ("ASICs").

In a preferred embodiment, the circuitry 182 is implemented entirely within the housing 136, which represents a self-contained device 108. However, this is purely exemplary; such circuitry, or a portion thereof, may be used instead in conjunction with a "host" system (not shown), such as a bill acceptor or changer that is part of an unattended, self-service vending machine. Other "host" systems may be contemplated, such as high-speed currency sorters/counters, or stand-alone bill acceptors for verifying the authenticity and denomination of currency paper. Typically, the "host" system contains its own electronics (not shown) for carrying out the functions associated with that particular device.

The circuitry 182 of FIGS. 7(*a*) and 7(*b*) includes an oscillator circuit 186 that provides the time-varying, square-wave oscillator signal on the signal line 190. If the capacitor, C2 194, is inserted into the oscillator circuit, then the oscillator circuit 186, comprised of a number of resistors and an operational amplifier, U1 198, ("op-amp"), generates the oscillator signal. In this instance, the input signal "FREQ" on the signal line 202, is not utilized. Conversely, if the capacitor, C2 194, is deleted from the oscillator circuit 186, then the oscillator signal is provided from a host system as the signal "FREQ" on the line 202, and the op-amp, U1 198, merely acts as a voltage follower. The op-amp, U1, may comprise the commercially-available Model TL714C, available from Motorola. The values for all of the resistors and capacitors comprising the circuitry of FIGS. 7(*a*) and 7(*b*) are given in Tables I and II, respectively.

TABLE I

| REFERENCE NO. | RESISTOR NO. | RESISTANCE VALUE (OHMS) |
|---|---|---|
| 206 | R1 | 470K |
| 208 | R2 | 470K |
| 210 | R3 | 10K |
| 212 | R4 | 10K |
| 214 | R5 | 10K |
| 216 | R6 | 10K |
| 218 | R7 | 1K |
| 220 | R8 | 1K |
| 222 | R9 | 1K |
| 224 | R10 | 1K |
| 226 | R11 | 500 |
| 228 | R12 | 10K |
| 230 | R13 | 10K |
| 232 | R14 | 6.8K |
| 234 | R15 | 33K |
| 236 | R16 | 33K |
| 238 | R17 | 2.2K |
| 240 | R18 | 33K |
| 242 | R19 | 1K |
| 244 | R20 | 470 |
| 246 | R21 | 10K |
| 248 | R22 | 2K |
| 250 | R23 | 750 |
| 252 | R24 | 2K |
| 254 | R25 | 20K |
| 256 | R26 | 20K |
| 258 | R27 | 10K |
| 260 | R28 | 2K |
| 262 | R29 | 1M |
| 264 | R30 | 1M |
| 266 | R31 | 20K |
| 268 | R32 | 4.7K |
| 270 | R33 | 4.7K |
| 272 | R34 | 10K |
| 274 | R35 | 110K |
| 276 | R36 | 10K |
| 278 | R37 | 10K |
| 280 | R38 | 110K |
| 282 | R39 | 10K |
| 284 | R40 | 10K |
| 286 | R41 | 20K |
| 288 | R42 | 20K |
| 290 | R43 | 10K |
| 292 | R44 | 51K |
| 294 | R45 | 51K |

TABLE I-continued

| REFERENCE NO. | RESISTOR NO. | RESISTANCE VALUE (OHMS) |
|---|---|---|
| 296 | R46 | 120 |
| 298 | R47 | 120 |
| 300 | R48 | 120 |
| 302 | R49 | 120 |
| 304 | R50 | 500K |
| 306 | R51 | 10K |

TABLE II

| REFERENCE NO. | CAPACITOR NO. | CAPACITANCE VALUE |
|---|---|---|
| 310 | C1 | 0.1 uf |
| 194 | C2 | 100 pf |
| 312 | C3 | 0.1 uf |
| 314 | C4 | 0.1 uf |
| 316 | C5 | 0.01 uf |
| 318 | C6 | 10 uf |
| 320 | C7 | 0.01 uf |
| 322 | C8 | 0.1 uf |
| 324 | C9 | 0.1 uf |
| 326 | C10 | 0.1 uf |
| 328 | C11 | 0.1 uf |
| 330 | C12 | 0.01 uf |
| 332 | C13 | 0.1 uf |
| 334 | C14 | 0.0047 uf |
| 336 | C15 | 0.0047 uf |
| 338 | C16 | 4.7 uf |
| 340 | C17 | 4.7 uf |
| 342 | C18 | 0.22 uf |
| 344 | C19 | 4.7 uf |
| 346 | C20 | 0.1 uf |
| 348 | C21 | 0.1 uf |
| 350 | C22 | 4.7 uf |
| 352 | C23 | 0.22 uf |
| 354 | C24 | 4.7 uf |
| 356 | C25 | 4.7 uf |
| 358 | C26 | 4.7 uf |
| 360 | C27 | 0.22 uf |
| 362 | C28 | 4.7 uf |
| 364 | C29 | 4.7 uf |
| 366 | C30 | 0.22 uf |
| 368 | C31 | 4.7 uf |

The oscillator signal on the line 190 is provided to the oscillator electrode 162. The oscillator signal is also provided through resistors R18 240, R19 242 to a pair of carrier signal inputs, pins 8 and 10, of a Model MC1496 balanced modulator/demodulator integrated circuit, U2 380, provided by Motorola. The function of the demodulator 380 will be described in detail hereinafter. The "positive" electrode 166 ("+") is connected to a positive voltage supply (+V, which typically equals +5 VDC) through a resistor, R1 206, which provides a predetermined amount of electrical charge onto the positive electrode 166. The positive electrode or sensor pad 166 is also connected to the base of an NPN transistor, Q1 384, which may comprise the Model 2N2369, commercially available from Motorola. The collector of the transistor Q1 384 is connected to the positive voltage supply. The transistor, Q1, functions as a preamplifier and is current-limited by the resistor, R1 206. The transistor output current at the emitter terminal is equal to the beta of the transistor multiplied by the transistor base current.

In a similar manner, the "negative" electrode 170 ("−") is connected to the positive voltage supply through a resistor, R2 208, and also to the base of an NPN transistor, Q2 386. This transistor, Q2 386, may also comprise the Model 2N2369. The emitter terminals of these transistors 384, 386 represent the outputs indicative of the amount of electrical charge on the corresponding positive and negative electrodes 166, 170. These emitters are connected through resistor and capacitor networks to a pair of signal inputs on the demodulator integrated circuit, U2 380. The emitters are also connected to the corresponding guard terminals 174, 178 associated with the positive and negative! electrodes 166, 170.

In operation of the verification device 108 of FIG. 5, the sensor pad arrangement 158 on the bottom panel 154 of the device is directed to pass over the long dimension of the security thread 100 embedded within the security paper 104. FIG. 6 is representative of a number of different instances in time when the electrically-conductive metallized regions 128 on the security thread 100 are disposed relative to the sensor pad arrangement 158. FIG. 6 position (*a*) illustrates the instance where the conductive thread regions 128 are not yet disposed adjacent to, or in close contact with, the sensor pad arrangement 158. In FIG. 6 position (*b*), the thread 100 is disposed relative to the sensor pad arrangement such that a first conductive region 390 is disposed only over one of the sensor pads (the positive or "+" pad 166) and not over the oscillator pad 162. The length of this conductive thread region 390 is approximately the same as that of the width of both the positive and negative sensor pads 166, 170; that is, in a preferred embodiment, the length of this conductive thread region 390, labeled "a" and the width of the sensor pads are both 0.1 inches. Thus, no capacitive coupling of the oscillator signal can occur between the oscillator pad 162 and either sensor pad 166, 170.

FIG. 6 position (c) illustrates the situation where the shortest conductive thread segment 390 bridges a portion of the oscillator pad 162 and a portion of the positive sensor pad 166. However, the amount of conductive thread metal bridging those two pads is not sufficient to create an appreciable amount of capacitive coupling of the oscillator signal over to the positive sensor pad 166. Also, FIG. 6 position (c) illustrates that the next sequential electrically-conductive thread segment 394 (also of the shortest length, or a type "a" segment) covers a portion of the positive sensor pad 166.

FIG. 6 position (d) illustrates the situation where the first type "a" thread segment 390 covers the oscillator pad 162, while the next sequential thread segment 394, also a type "a" segment, covers the positive sensor pad 166. However, due to the gap or space 124 between those two type "a" segments, the oscillator signal cannot be capacitively coupled from the oscillator pad 162 into the positive sensor pad 166.

FIG. 6(*e*) illustrates the situation where the first type "a" thread segment 390 covers only the negative or "−" sensor pad 170, the next type "a" thread segment 394 covers only the oscillator pad 162, while the following thread segment 398 covers only the positive sensor pad 166. However, this third thread segment 398 is twice as long as each of the first two thread segments 390, 394. Thus, this third thread segment 398 is designated as a type "b" thread segment. Yet, a non-electrically-conductive gap or space 124 separates the second type "a" thread segment 394 from this first type "b" thread segment 398. Again the oscillator signal is not capacitively coupled into either outer sensor pad 166, 170.

FIG. 6 position (f) illustrates the situation where the first type "a" thread segment 390 has moved off of the sensor pad arrangement 158 entirely. The second type "a" thread segment 394 only covers the negative sensor pad 170. On the other hand, the first type "b" thread segment 398 covers the oscillator pad 162 in its entirety, while also covering the positive sensor pad 166. In this situation, the oscillator signal is now capacitively coupled into the positive sensor pad covered by the type "b" thread segment 398. The signal processing circuitry 182 interprets this coupling. Further, because each of the two outer sensor pads 166, 170 are connected to different inputs on the demodulator integrated circuit 380, such circuit 380 can interpret which of the two sensor pads 166, 170 is covered by the type "b" thread segment 398 in FIG. 6 position (*f*).

Referring now to FIG. 6(*g*), there illustrated is the situation where the first type "b" thread segment 398 now covers the oscillator pad 162 and also the negative sensor pad 170, which couples the oscillator signal thereinto. The demodulator integrated circuit 380 can distinguish this situation from that illustrated in FIG. 6 position (*f*).

Finally, FIG. 6 position (*h*) indicates the situation where the first type "b" thread segment 398 merely covers the negative sensor pad, while the next type "b" thread segment 402 covers the oscillator pad 162 and also the positive sensor pad 166. Thus, the demodulator integrated circuit 380 interprets this situation in a similar manner to that of FIG. 6 position (*f*).

It can be seen from the foregoing that thread segments 128 that are of a length that equals the width of either the oscillator pad 162 or either of the two outer sensor pads 166, 170 does not couple the oscillator signal into either outer sensor pad at any point during passage of such segment over the sensor pad arrangement 158. On the other hand, a thread segment 128 that is at least twice as long as the shortest thread segment causes capacitive coupling of the oscillator signal into one of the outer sensor pads when that thread segment covers most or all of both the oscillator pad and that outer sensor pad. The demodulator integrated circuit 380 can determine or interpret which outer sensor pad 166, 170 is covered. The longer thread segments (i.e., type "b" 398, 402) initially cover the oscillator pad 162 and one of the outer sensor pads 166, 170, depending upon the scanning direction. Then, at a later point in time during the scanning of the thread 100, the longer thread segment will cover the oscillator pad and the other outer sensor pad. Thus, this type "b" thread segment 398, 402 generates a pulse to the demodulator integrated circuit 380 when the first sensor pad 166 is covered, and then the thread segment generates a pulse to the demodulator integrated circuit when the other sensor pad 170 is covered. The demodulator integrated circuit 380 can distinguish between these two pulses. In the situation where the thread segment is made long enough to cover simultaneously the oscillator pad and both sensor pads, then an equal amount of coupling of the oscillator signal into the two outer sensor pads 166, 170 will occur. The demodulator integrated circuit 380 interprets this as a zero or null condition.

Referring again to FIGS. 7(*a*) and 7(*b*), when a thread segment 128 capacitively couples the oscillator signal into one or both of the outer sensor pads 166, 170, an amount of electrical charge is capacitively coupled by the thread segment from the oscillator electrode 162 over to the "bridged" sensor pad 166, 170. This has the effect of changing (i.e., increasing) the capacitance seen by the base terminal of the associated transistor, Q1 384 or Q2 386. This has the further effect of altering the characteristic of the signal at the emitter terminal of the associated transistor. Since the emitter terminal of each transistor 384, 386 is connected to an associated input on the demodulator integrated circuit 380, the demodulator sees these altered signal characteristics. In the circuitry 182 as illustrated, such signal characteristic is in the form of a voltage variation, or a pulse. The increased capacitance of the "bridged" sensor pad causes the rise time of the voltage pulse at the associated transistor emitter terminal to be slower. The demodulator integrated circuit 380 and its associated circuitry can interpret this slower rise time accordingly.

On the other hand, when the oscillator signal is not coupled into either sensor pad 166, 170, the amount of electrical charge, and, thus, the amount of capacitance, at the base of the associated transistor 384, 386 is kept constant and relatively small. Thus, the resulting rise time of the voltage signal fed to the corresponding demodulator input is constant and is faster than when a thread segment couples the oscillator signal into a sensor pad.

The output of the demodulator integrated circuit 380 at pin 12 is a signal that has amplitude variations in only one voltage direction (either positive or negative) when the two signals at its inputs, pins 1 and 4, differ as a result of the capacitive coupling of the oscillator signal into only one of the sensor pads 166, 170. That is, the demodulator extracts and amplifies only the "in-phase" difference between the two input signals from the sensor pads. The output signal from the demodulator integrated circuit is fed to a PNP transistor, Q3 406, which may comprise the Model 2N2907, available from Motorola. The transistor 406 functions as a current amplifier and applies its output at the collector terminal to the negative input of an op-amp, U3 410, which may comprise the Model LM358, available from Motorola. Op-amp U3 410 is configured as an inverting amplifier, and its output signal "VOUT" is a single-ended output signal referenced to ground that is indicative of the demodulator output.

The circuitry 182 of FIGS. 7(a) and 7(b) further includes another op-amp, U4 414, which may also comprise the Model LM358, available from Motorola, and configured as an amplifier. On the negative input of op-amp U4 414 is fed the voltage value on the capacitor C13 332, which charges as a function of the DC voltage value of the signal VOUT. The capacitor voltage is compared to the signal REF on a line 418, supplied by a host system where utilized, and any difference therebetween is output from the op-amp U4 414 to the negative terminal of the op-amp U3 410. The op-amp U4 414 removes any DC voltage bias from the signal VOUT. Normally, VOUT is an AC signal whose average value is equal to approximately one-half of the positive voltage supply. The signal REF is merely a DC voltage of a predetermined value (e.g., one-half of the positive supply voltage). The signal REF is also fed to the positive input of the op-amp U4 414.

The circuitry 182 also includes a potentiometer, R11 226, that is adjustable to offset any differences in the gains of the transistors, Q1 384 and Q2 386. Because the amplitudes of the signal from the two sensor pads 166, 170 may differ slightly due to small processing differences or differences in the transistors Q1 384 and Q2 386, the potentiometer R11 226 is required. When balance is correct, the response from the sensor pads will not change in amplitude when the sensor pads are placed on paper, because the signals from each will have changed together. Since the demodulator 380 amplifies only the differences between the sensor signals, no change in the demodulator output will occur for ideally balanced sensor pad output signals. Thus, with no coupling of the oscillator signal into either sensor pad 166, 170, the voltage level of the signal VOUT on the line 422 should equal one-half of the positive supply voltage.

Diodes D1 426, D3 430 and D4 434 may each comprise the Model 1N914, available from Motorola. As mentioned hereinbefore, the circuitry 182 of FIG. 7(a) may be implemented as discrete components. On the other hand, most of the circuitry of FIG. 7(a) (with the exception of resistors R1 206 and R2 208, transistors Q1 384 and Q2 386 and capacitor C1 310), may instead be embodied within an ASIC, which may comprise the Model CAL160, commercially available from Calogic Corporation, Fremont, Calif.

If the sensor pad arrangement 158 was intended to be used with a host system, such as a bill acceptor or currency counter, then the circuitry 182 of FIG. 7(a) would interface with the electronics of such host system. Specifically, the signal VOUT on the signal line 422 would be interpreted by the host system's electronics as containing a number of pulses. Pulses that swing above the quiescent or steady-state level (i.e., one-half of the positive supply voltage) are indicative of instances where the oscillator signal has been capacitively coupled into the positive electrode 166. On the other hand, those pulses which have excursions that go below the quiescent or steady-state output are indicative of instances where the oscillator signal is coupled into the negative electrode 170. Further, as long as the thread segment 128 is made long enough to couple the oscillator signal into one or both of the sensor pads, a pulse of one polarity (e.g., positive) will occur first followed by a pulse of the opposite polarity (e.g., negative). Which type of pulse occurs first depends on the direction of travel of the sensor pad arrangement 158 with respect to the security thread 100. The host system (or the device 108 of FIG. 5) may then determine the denomination of the currency paper 104 by counting the number of either the positive or negative or both types of pulses and comparing the resulting count number to various ranges of counts to determine the ultimate denomination of the currency paper 104.

Instead, in a preferred embodiment as illustrated in FIG. 5, the device 108 is a self-contained unit that also contains the signal processing electronics 182 of FIG. 7(b) to interpret or count the pulses present in the signal, VOUT, on the signal line 422 and determine the resulting denomination of the currency paper 104 from the resulting pulse count.

Typically, all of the components illustrated in FIG. 7(b) are powered by a voltage supply, +V, of +5 VDC. Such regulated voltage may be supplied a voltage regulator (not shown) fed from a battery (not shown). Typically, the signal, VOUT, output from the differential amplifier, U3 410, has a quiescent or steady state output voltage of approximately +4.5 VDC. This represents one-half of the voltage (+9 V) supplied on a line to the op-amp, U3 410. When a thread segment 128 capacitively couples the oscillator signal into the positive or negative sensor pads 166, 170, the voltage value of the signal, VOUT, varies from approximately +1.4 VDC to +8.9 VDC. The signal VOUT on the line 422 is passed through a 3.3 VDC zener diode, D2 438, to shift the signal range down to approximately 0 VDC to +5.5 VDC. By using a zener diode rather than a simple voltage divider, the quiescent point of the signal, VOUT, is shifted downward without decreasing the range of the signal.

The signal, VOUT, is then fed through a low-pass filter, comprising resistors R32 268 and R33 270, and capacitors C14 334 and C15 336, to the non-inverting input, PIN 2, of a fast comparator, U5 442. The comparator 442 may comprise the Model LT1016, commercially available. A reference signal is also provided to pin 3 of the comparator 442. The comparator has a balanced output, supplying both a positive and a negative output. The positive output is supplied on pin 7, whereas the negative output is supplied on pin 8. The positive output is routed back to the non-inverting input via a resistor, R35 274. The negative output is fed back to the inverting or negative input via a resistor, R38 280; the voltage value of the negative input being derived from a potentiometer, R36 276.

The output of the comparator U5 442 from pin 7 on the signal line 446 comprises a digital output stream of data bits with clean edges that are suitable for counting. Each transition from a logic LO to a logic HI indicates that the oscillator signal has been capacitively coupled by a thread segment 128 into the positive sensor pad 166. On the other hand, each transition from logic HI to logic LO indicates that the thread segment 128 has coupled the oscillator signal into the negative sensor pad 170. As the sensor pad arrangement 158 moves over the security thread 100, a series of logic HI to logic LO, and logic LO to logic HI, transitions are present in the comparator output signal as the thread segments first couple the oscillator signal into the positive sensor pad 166 and then into the negative sensor pad 170 (assuming one direction of travel of the sensor pad arrangement 158 over the security thread 100; the transitions would be of the opposite sequence if the sensor pad arrangement was scanned over the security thread in the opposite direction). Then, counting either one of the two types of signal transitions, or both types of the signal transitions, provides the basis for deciding which of the different thread segment lengths are present in the security thread 100, and, thus, for determining the denomination of the currency paper 104.

After passing through the low pass filter, the signal, VOUT, on the signal line 422, is fed to the non-inverting input of each of two comparators contained within an integrated circuit, U6 450. The integrated circuit 450 may comprise the Model LM393N, provided by Motorola. Connected to the inverting input of a first one of the comparators is circuitry that functions as a high set point adjust. The circuitry comprises resistors R40 284 and R41 286, and capacitors C19–C21 344–348. The output of this comparator is a logic HI when the voltage of the input signal, VOUT, exceeds the voltage established by this high set point adjust circuitry. In a similar manner, the inverting input of the second comparator is connected to a low set point adjust circuit that comprises adjustable resistor R43 290 and capacitor C22 350. The output of this comparator is a logic LO if the signal, VOUT, has its voltage level below the voltage value established by this low set point adjust circuit.

The comparator outputs are fed on respective signal lines 454, 458 to corresponding inputs of a programmable array logic integrated circuit ("PAL"), U7 462. The PAL U7 462 may comprise a commercially-available device, the Model PALCE22V10Z-25, provided by Advanced Micro Devices. This PAL device is a programmable AND array driving a fixed OR array. The AND array is programmed to create custom product terms, while the OR array sums selected terms at the outputs. Thus, the PAL 462 implements the familiar Boolean logic transfer function, the sum of products. In this particular configuration, the PAL 462 is programmed as both a counter and a display decoder.

The positive or non-inverting output of the fast comparator, U5 442, on a signal line 446 is fed to an input, PIN 4, of the PAL U7 462, and it is also fed to a trigger input, PIN 4, of a retriggerable monostable multivibrator or timer, U8 466. The timer 466 may comprise an integrated circuit, the Model CD4538B, commercially available. This particular device contains a pair of identical retriggerable monostable multivibrators or timers. The output of the first timer on a line 470 is connected back to an input, PIN 5, of the PAL U7 462. The second timer within the integrated circuit 466 functions as a power-up reset circuit for the counter in the PAL U7 462.

Four output lines from the PAL connect to corresponding LEDs 142–148. A first LED 142 serves as the "thread detect" indicator (FIG. 5) and is illuminated in a blinking manner every time the sensor pad arrangement encounters a thread segment. The remaining LEDs 144–148 (COUNT 1, COUNT 2, COUNT 3) indicate the corresponding counts (and, thus, the currency denomination) determined by the counter in the PAL U7 462 from the signal on the line 446 fed to the PAL from the fast comparator, U5 442.

Referring again to FIG. 5, the device 108 illustrated therein is utilized by drawing or pushing the device down the entire length of the security thread 100 embedded within the currency paper 104. Thus, before starting, a quick visual check of the presence and location of the security thread within the currency paper may be made by holding up the paper to transmitted light. If the first security detection feature (the characters "USA" 116) are present, the test may continue. The paper under test is then placed preferably on a pliable surface, such as a computer mouse pad 132. The thread 100 is then scanned beginning with the device 108 completely off of the currency paper 104. The user then depresses and holds the button 140 in on the side of the device housing 136. At the same time, the sensor pad arrangement 158 is passed over the entire length of the thread 100. The button 140 is held in until the appropriate reading has been displayed on the LEDs 142–148 mounted on the top panel 150 of the device 108. The button 140 is merely a switch that connects power from a battery, such as a standard 9.0 VDC battery (not shown), disposed within the device housing 136 to the circuitry of FIG. 7. Releasing the button disconnects power from the circuitry 182 of FIG. 7 and acts as a reset of the circuitry upon the next occurrence of power applied thereto.

As the sensor pad arrangement 158 is scanned over the thread 100, the first thread segment 128 of sufficient length (e.g., a type "b" segment 398) that the sensor pad array 158 encounters will cause the oscillator signal to be coupled from the oscillator pad 162 into, e.g., the positive sensor pad 166. This ultimately causes a signal transition of the non-inverting output of the fast comparator, U5 442, from a logic LO to a logic HI. This signal transition triggers the first timer 466 to count for a predetermined time period of approximately 0.3 seconds. This time period can be varied by adjusting the potentiometer, R51 306. At the start of this 0.3 second time period, the output of the first timer 466 on the signal line 470 assumes a logic HI. At the end of this time period, the output returns to a logic LO state. The logic HI output causes the PAL U7 462 to disable the LED output signals from illuminating the three "code" LEDs 144–148. On the other hand, the PAL U7 462 causes the "thread detect" LED 142 to be lit during the time that the output of the first timer 466 is a logic HI. Further transitions of the output of the fast comparator, U5 442, from logic LO to logic HI will retrigger the output of the first timer 466 to a logic HI such that three "code" LEDs 144–148 remain non-illuminated until the entire thread has been scanned. At that time, the appropriate LED will be lit, depending on the resulting denomination of the currency paper 104 determined by the PAL U7 462 from the number of thread segments counted thereby.

The counter in the PAL U7 462 is reset to zero at power-up of the circuitry 182 of FIGS. 7(a) and 7(b) as a result of the output of the second timer 466. The counter is a 5-bit binary counter, implemented in the PAL U7 462 using the available standard logic circuitry therein. After being reset at power-up, the counter counts the number of signal transitions of the output signal on the line 446 from the fast comparator, U5 442. As these signal transitions are received by the counter from the comparator, the counter accumulates the count and compares the resulting count to various count ranges stored within the PAL 462. The resulting one of the three "code" LEDs 144–148 is illuminated after scanning is complete depending upon the resulting range that the count falls within. In this way the denomination of the currency paper 104 is displayed to the user of the device 108.

It can be seen from the foregoing that the device 108 of FIGS. 5–7 operates by scanning currency paper 104 in the wide-feed direction and counting the number of electrically-conductive thread segments as they are sequentially encountered during the scan by the sensor pad arrangement 158. The circuitry 182 within the device 108 counts the number of discrete thread segments 128. The number of such segments can be varied to indicate different denominations of currency paper 104. It should be understood, however, that various configurations of the conductive thread segments may produce the same count number and, thus, the same indication of denomination. Nonetheless, the device 108 counts the number of segments 128 and compares the resulting count to stored values to determine the denomination of the currency paper.

Figure 8:
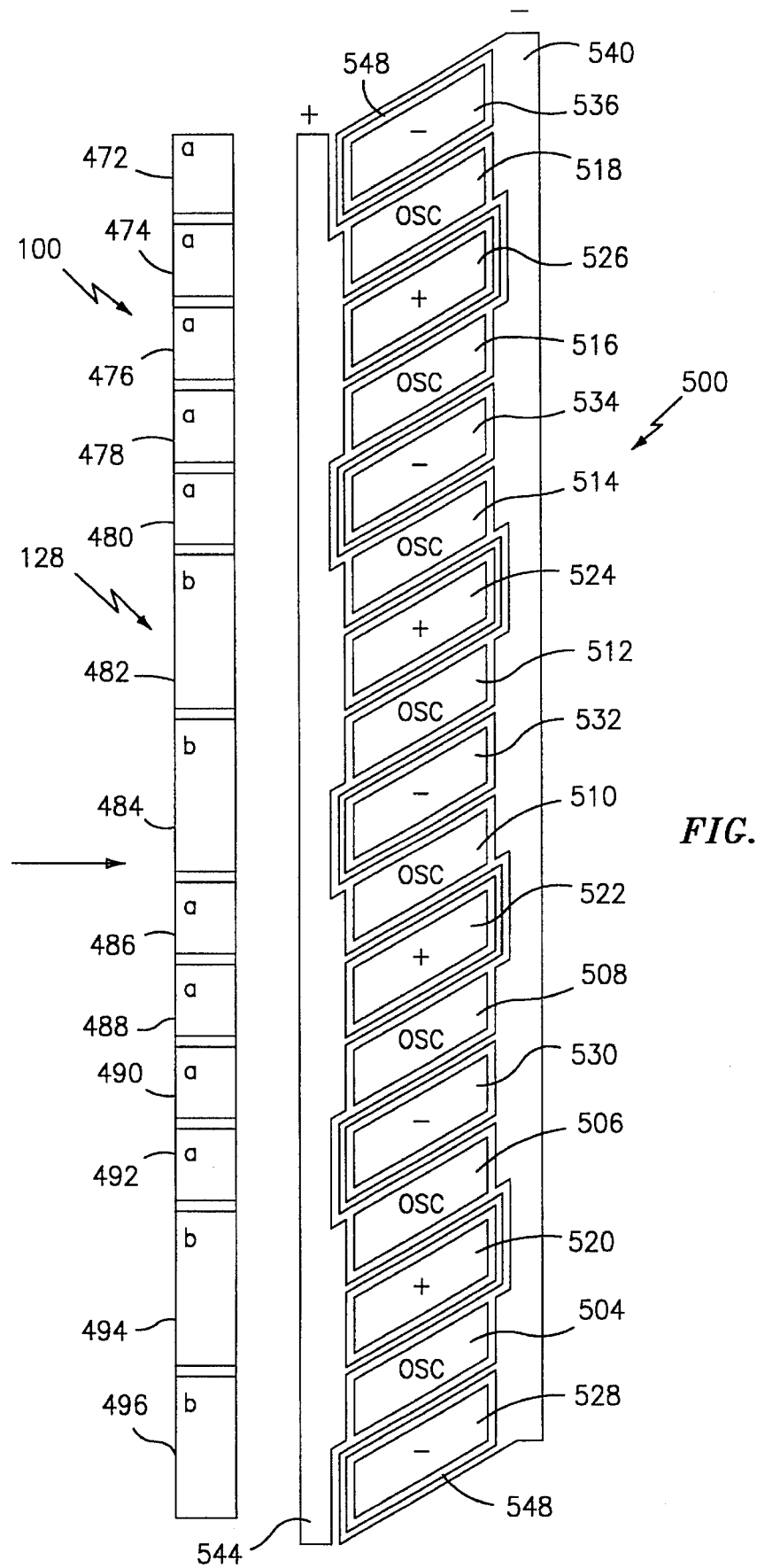
FIG. 8 illustrates the security thread of FIG. 3 in relation to a second preferred embodiment of a sensor pad arrangement.

Referring now to FIGS. 8–10, there illustrated is a second preferred embodiment; of a device, according to the present invention, for scanning a security thread 100 embedded within currency paper 104 and determining the authenticity of the paper by ascertaining the denomination of the paper. FIG. 8 illustrates an exemplary embodiment of the thread 100 containing a number of discrete, electrically-conductive thread segments separated by non-electrically-conductive insulated segments 128, somewhat similar to that illustrated in FIGS. 1–4. As viewed from top to bottom vertically in FIG. 8, the thread contains, in sequence, five type "a" segments 472–480 (i.e., the shortest type of thread segment in length), followed by two type "b" segments 482, 484 (the type "b" segment being twice as long as the type "a" segment), followed by four more type "a" segments 486–492, and then concluding with two type "b" segments 494, 496. Each type "a" segment is 0.1 inches long, while each type "b" segment is 0.2 inches long.

FIG. 8 also illustrates an alternative embodiment of a sensor pad arrangement 500 for use with this alternative, "narrow-edge" device. In this embodiment, the sensor pad arrangement 500 is required to detect the individual conductive thread segments 472–496 simultaneously. That is, the sensor pad arrangement passes (relative to the security thread 100) in the narrow-edge direction of the currency paper 104. Because of this, the sensor pad arrangement 500 now comprises a plurality of oscillator electrodes 504–518, a plurality of positive electrodes 520–526 and a plurality of negative electrodes 530–536. These electrodes 504–536 are arranged in an alternating sequence, as illustrated in FIG. 8.

Each type of pad or electrode 504–536 is slanted, in a preferred embodiment, to improve the detection capability of the sensor pad arrangement 500. However, in the alternative, the pads may be straight. The width of each pad is approximately equal to the width of the shortest thread segment (i.e., a type "a" segment 472–480, 486–492). In the preferred embodiment, this width equals approximately 0.1 inches. The length of each pad is approximately 0.17 inches, in a preferred embodiment. Surrounding all of the negative electrodes 528–536 is a guard ring 540. A second guard ring 544 surrounds all of the positive electrodes 520–526. The guard rings 540, 544 prevent stray electrical fields from undesirably coupling the oscillator signal into the positive and negative electrodes. A non-electrically-conductive region 548 encircles each pad. In a preferred embodiment, the width of such region 548 is approximately 0.005 inches. Further, the width of the guard ring 540, 544 surrounding each pad is approximately 0.005 inches. The arrowhead of FIG. 8 illustrates the relative direction of the thread 100 with respect to the sensor pad arrangement 500 during "narrow-edge" scanning.

Referring now to FIG. 9, at the top thereof FIG. 9(*f*) is an illustration of the thread 100 and sensor pad arrangement 500, similar to that of FIG. 8. FIG. 9 also includes five signal waveforms 550–558, FIGS. 9(*a*)–(*e*). These waveforms 550–558 correspond to electrical signals that are generated by the circuitry 560 of FIGS. 10(*a*) and 10(*b*), at five different points along the travel of the thread 100 with respect to the sensor pad arrangement 500. These five points are indicated in FIG. 9(*f*) by the numerals "1"–"5".

Position number 1 in FIG. 9(*f*) corresponds to the situation where the thread 100 has not yet contacted any portion of the sensor pad array 500. Thus, the signal waveform 550 of FIG. 9(*a*) indicates a steady-state voltage signal value of 0 VDC. At position 2, the left-most type "b" thread segment 496 (as viewed in FIG. 9(*f*) capacitively couples the oscillator signal on the pad 504 into the adjacent negative electrode 528. Referring to FIG. 9(*b*), this is indicated by the voltage pulse 564 at a negative voltage level. Proceeding in a rightward direction along the thread, the next type "b" thread segment 494 capacitively couples the oscillator signal from the pad 506 into the positive electrode 520. Referring to FIG. 9(*b*), this is illustrated as a positive-level voltage pulse 568. The next four type "a" segments 486–492 are not long enough to couple the oscillator signal into any positive or negative pads. This is indicated by the zero voltage level 572 in FIG. 9(*b*). Next, the two "b" type segments 484, 482 capacitively couple the oscillator signal from the respective oscillator pad 512, 514 into the negative pad 532 and the positive pad 524. This generates a negative pulse 576 and a positive pulse 580. Finally, the five remaining type "a" thread segments 472–480 do not couple the oscillator signal into any positive or negative pads, thereby generating a zero voltage level 584.

It can be seen from the foregoing that the exemplary arrangement of thread segments comprising the security thread 100 of FIG. 9 generates a unique and distinctive signal waveform 552. The waveform comprises positive, negative and zero voltage levels that are ultimately interpreted by the circuitry 560 of FIGS. 10(*a*) and 10(*b*) in determining the denomination of the currency paper 104. The waveform 552 of FIG. 9(*b*) would suffice as an indicator of the denomination of the security thread.

However, by continuing relative motion of the thread 100 with respect to the sensor pad arrangement 500 in FIG. 9(*f*), it will be seen that a signal waveform 556 having a different arrangement of voltage levels or pulses is generated at FIG. 9(*d*). This signal may, if desired, function as a redundant check of the authenticity of the thread 100. The waveform 556 of FIG. 9(*d*) corresponds to position 4 of the thread 100 with respect to the sensor pad arrangement 500. However, referring first to the waveform of FIG. 9(*c*), this waveform 554 corresponds to position 3 of the thread 100 with respect to the sensor pad arrangement 500. This position corresponds to the approximate midpoint of the length of the individual pads within the arrangement. In such position, none of the type "b" thread segments 482, 484, 494, 496 overlaps or covers enough of an oscillator pad 504–518 to capacitively couple the oscillator signal into an adjoining positive or negative electrode. The same is true for the type "a" thread segments 472–480, 486–492. Thus, the resulting signal output is entirely 0 VDC, as illustrated in FIG. 9(*c*).

At position 4, the first type "b" thread segment 496 overlaps only the left-most negative pad 528. The next type "b" thread segment 494 overlaps both the oscillator pad 504 and the positive electrode 520. Thus, the oscillator signal is coupled from that oscillator pad into the positive electrode. This is indicated by the positive-going pulse 588 of FIG. 9(d). The next four type "a" thread segments 486–492 do not couple the oscillator signal from any oscillator pad into the corresponding positive or negative electrode. Next, the type "b" thread segment 484 couples the oscillator signal on the oscillator pad 510 into the negative electrode 532, generating a negative pulse 592. The next type "b" thread segment couples the oscillator signal on the oscillator pad 512 into the positive electrode 524, generating a positive pulse 596. Finally, the remaining five type "a" thread segments 472–480 do not couple the oscillator signal from any oscillator pad into a positive or negative electrode.

Figure 9A:
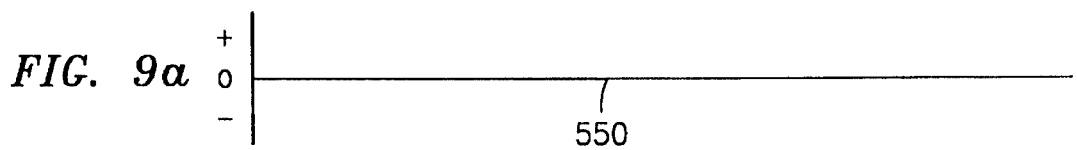
FIGS. 9(a)–9(f), is similar to FIG. 8, but includes various signal waveforms generated by capacitive coupling of an oscillator signal into particular ones of the sensor pads in the arrangement of FIG. 8.
Figure 9B:
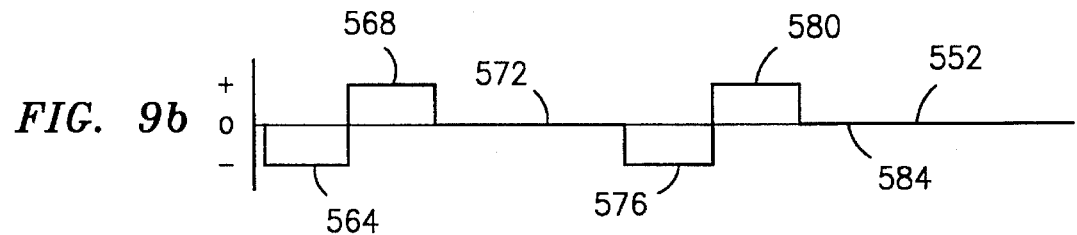
Figure 9C:
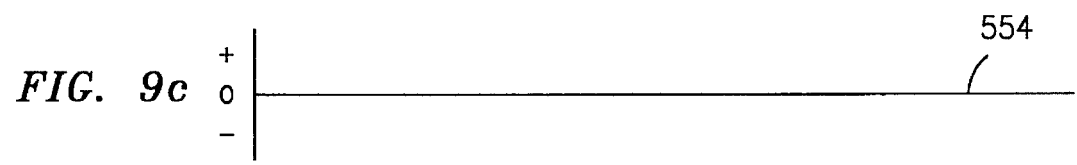
Figure 9D:
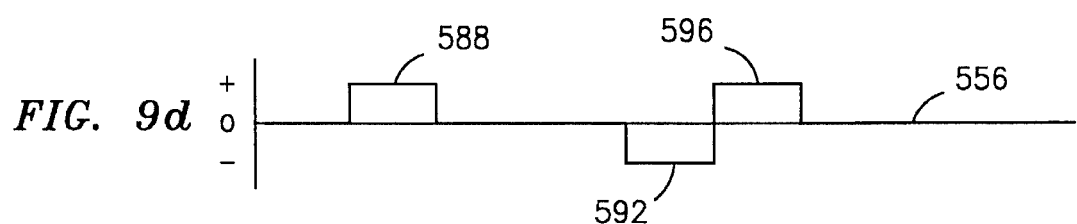
Figure 9E:
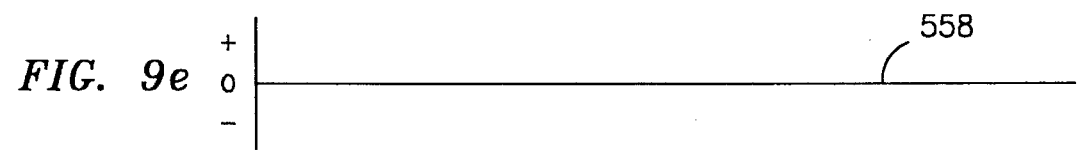
Figure 9F:
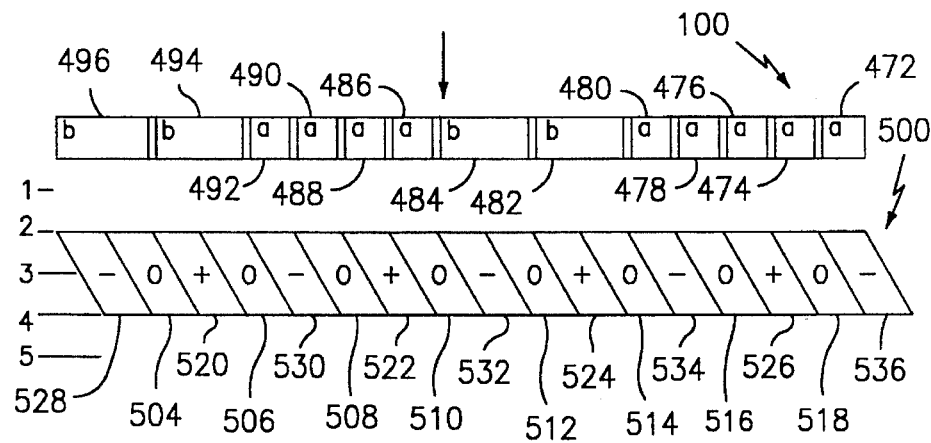

The signal waveform 558 of FIG. 9(e) illustrates the situation where the security thread 100 has moved completely by the sensor pad arrangement 500. Thus, the resulting signal waveform 558 is at 0 VDC.

Figure 10A:
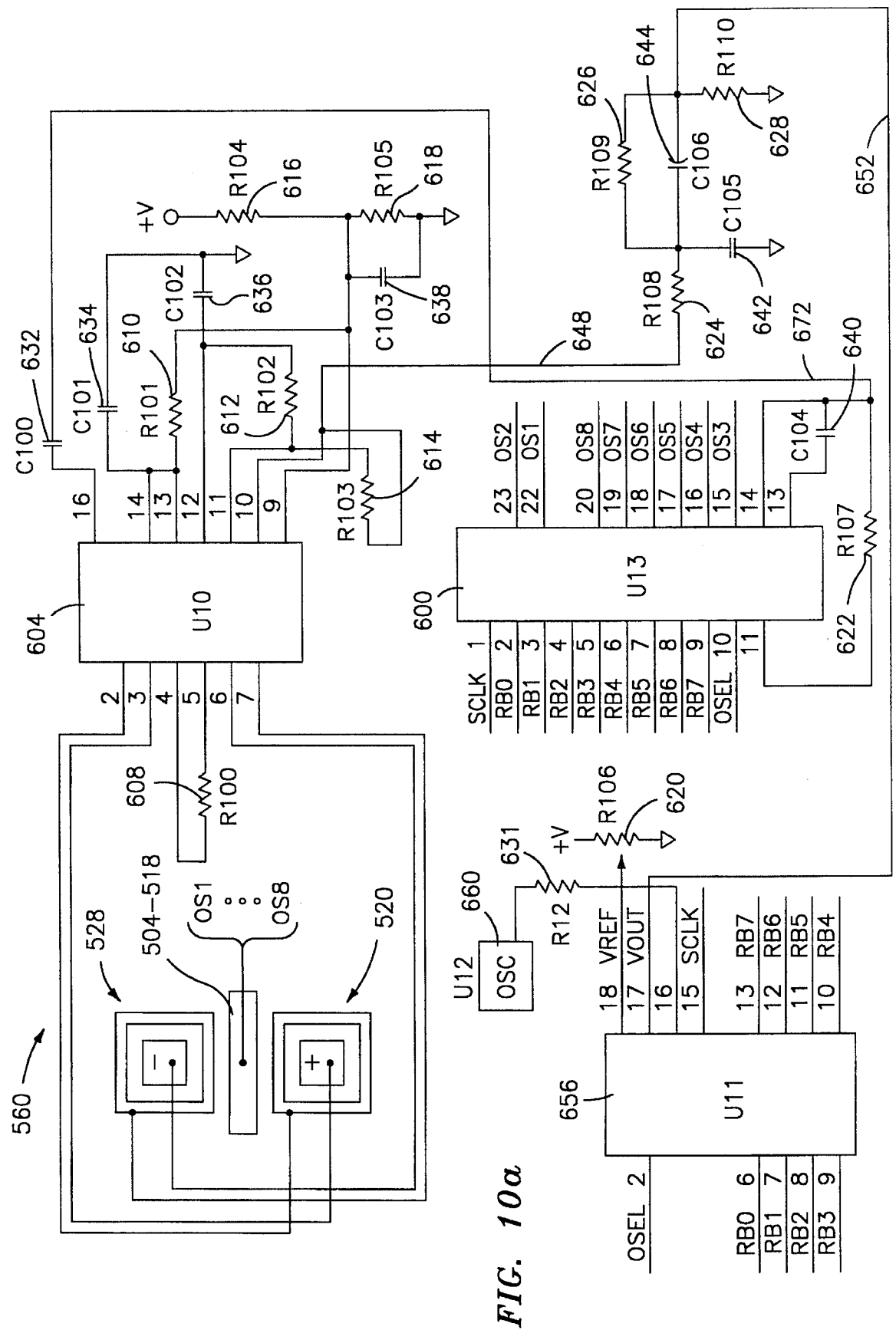
FIGS. 10(a)–10(b), is a schematic diagram of the electrical connection of the sensor pad arrangement of FIG. 8, together with associated signal processing electronics, in an alternative embodiment of the device of FIG. 5.

Referring now to FIGS. 10(a) and (b), which together comprise FIG. 10, there illustrated in schematic form is electronic circuitry 560 that interfaces with the sensor pad array 500 of FIGS. 8 and 9. Since all of the positive electrodes 520–526 are connected together, only one positive electrode 520 is indicated in FIG. 10(a). Similarly, since all of the negative electrodes 528–530 are connected together, only one negative electrode 528 is illustrated[in FIG. 10(a). However, each of the oscillator pads 504–518 is connected to a separate oscillator signal, OS1–OS8. These signals emanate from a programmable array logic ("PAL" ) integrated circuit, U13 600, described in detail hereinafter.

The positive and negative electrodes 520–526, 528–536, each connect over corresponding signal lines to associated inputs of an ASIC, U10 604, which may comprise the Model CAL160, provided by Calogic Corporation, Fremont, Calif. The circuitry within the ASIC 604 may be similar to that utilized for the wide-edge sensor and illustrated in FIG. 7(a). Also connected to corresponding inputs of the ASIC 604 are the positive and negative guard electrodes 540, 544. The ASIC 604 contains a synchronous modulator/demodulator circuit, similar to that of FIG. 7(a), that has as input the signal lines from the positive and negative electrodes 520–526, 528–536, and provides a single-ended analog output signal, VOUT, on pin 10 of the ASIC 604. This analog signal, in a similar manner to the wide-edge-feed configuration of FIG. 7, is a signal that contains voltage pulses above and below a quiescent (steady state) point that are indicative of instances of capacitive coupling of the oscillator signal into any of the positive and negative electrodes. Tables 3 and 4, respectively, contain the values for all of the resistors and capacitors illustrated in FIGS. 10(a) and 10(b).

TABLE III

| REFERENCE NO. | RESISTOR NO. | RESISTANCE VALUE (OHMS) |
| --- | --- | --- |
| 608 | R100 | 470 |
| 610 | R101 | 10K |
| 612 | R102 | 10K |
| 614 | R103 | 22K |
| 616 | R104 | 220K |
| 618 | R105 | 220K |
| 620 | R106 | 1K |
| 622 | R107 | 10K |
| 624 | R108 | 1K |
| 626 | R109 | 1K |

TABLE III-continued

| REFERENCE NO. | RESISTOR NO. | RESISTANCE VALUE (OHMS) |
| --- | --- | --- |
| 628 | R110 | 10K |
| 630 | R111 | 10K |
| 632 | R112 | 1K |

TABLE IV

| REFERENCE NO. | CAPACITOR NO. | CAPACITANCE VALUE |
| --- | --- | --- |
| 634 | C100 | 330 pf |
| 636 | C101 | 0.1 uf |
| 638 | C102 | 470 pf |
| 640 | C103 | 0.1 uf |
| 642 | C104 | 100 pf |
| 644 | C105 | 3300 pf |
| 646 | C106 | 10 uf |

The output signal, VOUT, from pin 10 of the ASIC and on a signal line 648 is provided to a filter circuit, comprised of resistors R108–R111 624–628 and capacitors C105–C106 642, 644. The filter output on a signal line 652 is fed to pin 17 of an 8-bit microcontroller integrated circuit, U11 656, which may comprise the Model PIC16C71, provided by Microchip Technology Incorporated of Chandler, Ariz. The microcontroller 656 contains 1K of EPROM program memory, together with 36, 8-bit general-purpose registers, and an analog-two-digital converter with four inputs. The microcontroller 656 also contains an 8-bit data bus, RB0–RB7.

An oscillator, U12 660, provides a time-varying signal on a line through a resistor, R112 631, to the oscillator input, pin 16, of the microcontroller, U11. The potentiometer, R106 620, connected between +9 VDC and ground, establishes an adjustable threshold voltage that the microcontroller 656 compares the signal, VOUT, to. The microcontroller, U11 656, contains a software program stored in its memory for processing the analog output signal, VOUT, and for directing the operation of other components in the circuitry 560 of FIGS. 10(a) and 10(b).

The circuitry also contains a pair of programmable array logic ("PAL" ) integrated circuits, U13 664, U14 668, that each may comprise the Model PALCE22V10Z-25, provided by Advanced Micro Devices. This type of PAL is similar to that utilized in the wide-edge-feed circuitry of FIG. 7. A first one of the PALs, U13 664, connects with the 8-bit data bus, and also with the clock signal, SCLK, and a latch signal, OSEL. This PAL U13 664 functions as a latch to pass the information on the 8-bit data bus, RB0–RB7, back to the eight oscillator pads 504–518 in the sensor pad array 500. The oscillator signals, OS1–OS8, contain the clock signal, SCLK, at a predetermined frequency. However, the clock signal is staggered or sequenced through all eight oscillator signals. The sequencing is done at a fast enough rate such that the clock or oscillator signal is applied to all eight of the oscillator pads 504–518 during the time that the security thread 100 is disposed "over" the entire sensor pad array 500. The PAL, U13 600, also has connected thereto a filter, comprised of a resistor R107 622 and a capacitor C104 640. The resistor R107 622 is fed a clock signal on a line 672 from the ASIC, U10 604. The purpose of this filter is to create a slight delay in the oscillator signals provided to the oscillator pads 504–518.

Figure 10B:
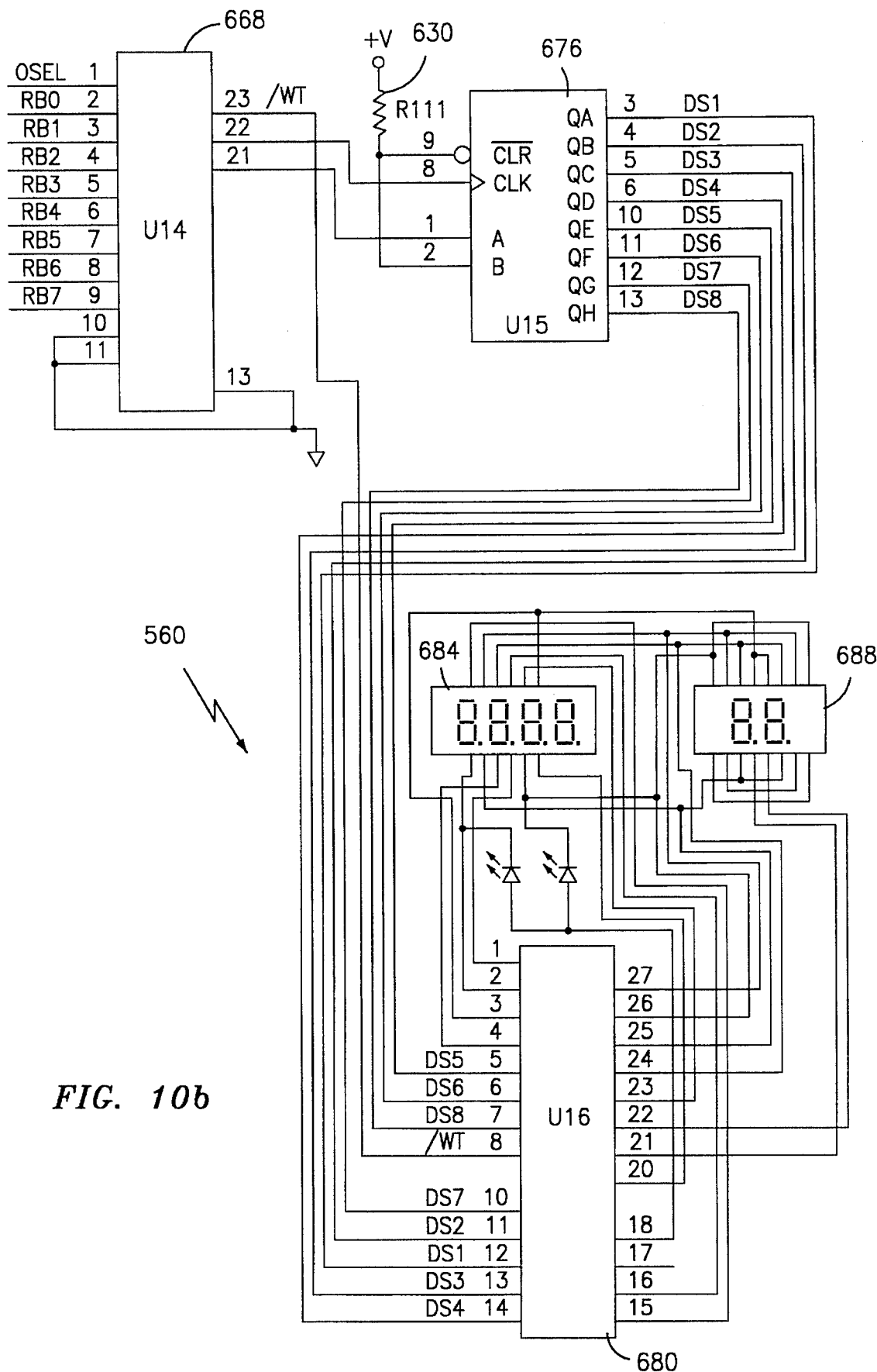

The second PAL, U14 668, also connects to the 8-bit data bus signals, RB0–RB7, and generates three signals that are used by the display processing circuitry of FIG. 10(b). One of the signals is a clock signal that is fed to the clock input of a decoder integrated circuit, U15 676, which may comprise the Model SN74HC164, commercially available. A second output of the PAL, U14 668, connects to one of the data inputs of the decoder, U15 676. The decoder 676 provides eight discrete output signals, DS1–DS5, to an 8-digit LED display decoder driver, U16 680, which may comprise the Model ICM7228, provided by Harris Semiconductor. This display driver 680 connects with a 4-digit LED 684 and a 2-digit LED 686, for display of information to the user, including information about the resulting denomination of the currency paper 104 scanned by the device of this alternative second preferred embodiment.

However, it should be understood that use of the decoder 676 and display driver 680 is purely exemplary. Other systems may be utilized for interfacing with the circuitry 560 of FIG. 10(a) and the PAL, U14 668, of FIG. 10(b). For example, the "host" system may comprise the Model CASHSCAN® money detection system, commercially available from the CashScan Corp. of Brooklyn, N.Y. Whatever the host system chosen, the PAL, U14 668, can be programmed for flexibility interfacing with the host system chosen.

Referring again to FIGS. 8 and 9, the sensor pad array 500 is constructed in this exemplary preferred embodiment with eight oscillator pads 504–518. This results in the possibility that the eight oscillator signals may be capacitively coupled into either an adjacent positive electrode 520–526 or an adjacent negative electrode 528–536, or none or both of the electrodes. By passing the thread 100 "over" the sensor pad array 500 such that the thread segments are all "seen" by the sensor pad array simultaneously, an 8-bit code is ultimately generated by the signal processing electronics 560 of FIG. 10. This 8-bit code is inherently embedded into the thread 100 by Utilizing varying lengths of conductive thread segments 128. In the embodiment of FIGS. 8 and 9, the thread 100 has two different lengths of conductive segments. The shorter segment length, the type "a", produces no capacitive coupling of the oscillator signal into any of the pads. Thus, the type "a" thread 472–480, 486–492 segment produces a logic LO or ZERO in the ultimate code. In contrast, the type "b" thread segment 482, 484, 494, 496 can capacitively couple an oscillator signal into either an adjacent positive or negative electrode. Thus, the type "b" longer thread segment may produce a logic HI or ONE in the ultimate code. Thus, by varying the sequence of logic Los and logic His, the inherent 8-bit code embedded into the security thread 100 can produce up to 256 different patterns or codes, which correspond to 256 different denominations of the currency paper 104 or other characteristics of other types of documents.

In a broad sense, the narrow-edge detector of this alternative embodiment of FIGS. 8–10 operates by continuously scanning the 8-bit thread pattern as the currency paper 104 is transported relative to the sensor pad array 500. When the thread is positioned "over" the sensor pad array, a signal, similar to that of FIG. 9(b), is generated that is ultimately processed by the electronics 560 of FIG. 10 into an 8-bit code. The microcontroller 656 then compares the resulting code to a table of codes stored in the memory of the microcontroller, U11. Each code corresponds to a denomination of the currency paper or another characteristic of the currency paper or other types of documents. This scanning process continues until the thread 100 has completely passed by the sensor pad array 500. This results in a plurality of signals for each security thread, wherein the signals may differ from each other, as evident from FIG. 9(b) and FIG. 9(d). Typically, the signal with the highest signal strength that produces a valid currency denomination is displayed to the user.

The software stored in the memory of the microcontroller, U11 656, may operate to choose the signal with the highest strength by storing the plurality of signals generated during a single scan in associated registers within the microcontroller, U11. The software may then implement threshold and/or peak detect functions on the stored signals to insure the integrity of the signals from which the resulting code indicative of the denomination of the currency paper is chosen.

It should be understood by those skilled in the art that obvious structural modifications can be made without departing from the spirit of the invention. Accordingly, reference should be made primarily to the accompanying claims, rather than the foregoing specification, to determine the scope of the invention.

Having thus described the invention, what is claimed is:

1. A device for verifying the authenticity of a document having a security thread at least partially embedded within the document, the security thread having a plurality of electrically-conductive regions separated from one another by corresponding non-electrically-conductive regions, the device comprising:

a. at least one oscillator electrode having a time-varying oscillator signal applied thereto;

b. at least one positive electrode disposed adjacent to and physically separate from the oscillator electrode;

c. at least one negative electrode disposed adjacent to and physically separate from the oscillator electrode; and d. signal processing means, connected to the oscillator electrode, the positive electrode, and the negative electrode, for providing the oscillator signal to the oscillator electrode, for sensing when the oscillator signal is capacitively coupled to the positive electrode and for providing a positive signal indicative thereof, for sensing when the oscillator signal is capacitively coupled to the negative electrode and for providing a negative signal indicative thereof, and for determining the presence of an authentic security thread associated with the document from a condition both where the positive signal contains a predetermined pattern of a plurality of pulses indicative of corresponding electrically-conductive regions on the thread and where the negative signal contains a predetermined pattern of a plurality of the pulses indicative of corresponding electrically-conductive regions on the thread, a characteristic of the plurality of pulses being indicative of a characteristic of the document.

2. The device of claim 1, wherein the document is a currency paper, and wherein the characteristic of the document is a denomination of the currency paper.

3. The device of claim 1, wherein the means for determining the presence of an authentic security thread comprises means for counting the electrically-conductive regions on the thread.

4. The device of claim 3, wherein the means for counting the electrically-conductive regions on the thread comprises means for counting the plurality of pulses in the positive signal and for determining the number of electrically-conductive regions therefrom, the number of electrically-conductive regions being indicative of a characteristic of the document.

5. The device of claim 4, wherein the document is a currency paper, and wherein the characteristic of the document indicated by the number of electrically-conductive regions on the thread is a denomination of the currency paper.

6. The device of claim 3, wherein the means for counting the electrically-conductive regions on the thread comprises means for counting the plurality of pulses in the negative signal and determining the number of electrically-conductive regions therefrom, the number of electrically-conductive regions being indicative of the characteristic of the document.

7. The device of claim 6, wherein the document is a currency paper, and wherein the characteristic of the document indicated by the number of electrically-conductive regions on the thread is a denomination of the currency paper.

8. The device of claim 1, wherein the means for determining the presence of an authentic security thread comprises means for comparing the pattern of the plurality of pulses within the positive signal to one or more predetermined positive reference signals and for determining when an authentic security thread is associated with the document from a condition where the pattern of the plurality of pulses within the positive signal matches a pattern of a plurality of pulses within the one or more positive reference signals.

9. The device of claim 1, wherein the means for determining the presence of an authentic security thread comprises means for comparing the pattern of the plurality of pulses within the negative signal to one or more predetermined negative reference signals and for determining when the authentic security thread is associated with the document from a condition where the pattern of the plurality of pulses within the negative signal matches a pattern of a plurality of pulses within the one or more negative reference signals.

10. A device for determining a denomination of a currency paper having a security thread associated with the currency paper, the security thread having a plurality of electrically-conductive regions separated from one another by corresponding non-electrically-conductive regions, the device comprising:

a. at least one oscillator electrode having a time-varying oscillator signal applied thereto;
   b. at least one positive electrode disposed adjacent to and physically separate from the oscillator electrode;
   c. at least one negative electrode disposed adjacent to and physically separate from the oscillator electrode; and
   d. signal processing means, connected to the oscillator electrode, the positive electrode and negative electrode, for providing the oscillator signal to the oscillator electrode, for sensing when the oscillator signal is capacitively coupled to the positive electrode and for providing a positive signal indicative thereof, for sensing when the oscillator signal is capacitively coupled to the negative electrode and for providing a negative signal indicative thereof, and for determining the denomination of the currency paper from a condition both where the positive signal contains a predetermined pattern of a plurality of pulses indicative of corresponding electrically-conductive regions on the thread and where the negative signal contains a predetermined pattern of a plurality of the pulses indicative of corresponding electrically-conductive regions on the thread, a characteristic of the plurality of pulses being indicative of a denomination of the currency paper.

11. The device of claim 10, wherein the means for determining the denomination of the currency paper comprises means for counting the plurality of pulses within the positive signal and for generating a positive count signal therefrom.

12. The device of claim 11, wherein the means for counting further comprises means for comparing the positive count signal to one or more positive reference signals to determine the denomination of the currency paper.

13. The device of claim 10, further comprising a plurality of positive electrodes all connected together, a plurality of negative electrodes all connected together, and a plurality of oscillator electrodes.

14. The device of claim 13, wherein each oscillator electrode within the plurality of oscillator electrodes has a corresponding time-varying oscillator signal applied thereto, and wherein the signal processing means comprises means for sensing when the corresponding oscillator signals are capacitively coupled into one or more of the positive or negative electrodes and for providing the positive and negative signals indicative thereof.

15. A device for determining a denomination of a currency or banknote paper having a security thread embedded therein, the security thread having a plurality of conductive regions separated from each other by corresponding non-conductive regions, the device comprising:

a. one or more oscillator electrodes having a corresponding time-varying oscillator signal applied thereto;
   b. one or more positive electrodes;
   c. one or more negative electrodes; and
   d. signal processing means, connected with the oscillator electrodes, the positive electrodes and negative electrodes, for providing the oscillator signal to the oscillator electrodes, for sensing when the oscillator signal is capacitively coupled into the positive electrodes, for sensing when the oscillator signal is capacitively coupled into the positive electrodes, for sensing when the oscillator signal is capacitively coupled into the negative electrodes, and for determining the denomination of the currency or banknote paper from one or more coupling signals indicative of the capacitive coupling of the oscillator signal into the positive or negative electrodes.

16. The device of claim 15, therein capacitive coupling of the oscillator signal into the positive and negative electrodes occur when a conductive region of the thread is of a predetermined length.

17. The device of claim 15, wherein the signal processing means comprises means for determining the denomination of the currency or banknote paper by counting a number of characteristic occurrences within one or more coupling signals.

18. The device of claim 15, wherein the signal processing means comprises means for determining the denomination of the currency or banknote paper by comparing a pattern within the one or more coupling signals to one or more predetermined reference patterns.

* * * * *